US012657603B2

(12) United States Patent
Li et al.

(10) Patent No.: US 12,657,603 B2
(45) Date of Patent: Jun. 16, 2026

(54) USER CONVERSION PREDICTION USING A MULTI-TASK MODEL

(71) Applicant: Snap Inc., Santa Monica, CA (US)

(72) Inventors: Weizhi Li, Freemont, CA (US); Joseph William Robinson, Portola Valley, CA (US); Xiaopeng Wu, Kenmore, WA (US); Peng Yang, San Jose, CA (US); Jason Brewer, Mountain View, CA (US)

(73) Assignee: Snap Inc., Santa Monica, CA (US)

( * ) Notice: Subject to any disclaimer, the term of this patent is extended or adjusted under 35 U.S.C. 154(b) by 93 days.

(21) Appl. No.: 18/888,770

(22) Filed: Sep. 18, 2024

(65) Prior Publication Data

US 2026/0080435 A1 Mar. 19, 2026

(51) Int. Cl.
*G06Q 30/02* (2023.01)
*G06Q 30/0242* (2023.01)
*G06Q 30/0251* (2023.01)

(52) U.S. Cl.
CPC ..... *G06Q 30/0246* (2013.01); *G06Q 30/0269* (2013.01)

(58) Field of Classification Search
CPC . G06Q 30/0246; G06Q 30/0269; G06N 20/00
See application file for complete search history.

(56) References Cited

U.S. PATENT DOCUMENTS

| 11,113,725 | B1 * | 9/2021 | Sandridge | .......... G06Q 30/0257 |
| 2021/0234687 | A1 * | 7/2021 | Zhou | ...................... G06Q 10/10 |
| 2024/0249337 | A1 * | 7/2024 | Tan | .......................... G06N 3/09 |

FOREIGN PATENT DOCUMENTS

CN 116939299 A1 * 11/2023 ......... G06Q 30/0269

OTHER PUBLICATIONS

Tang et al., "Progressive Layered Extraction (ple): A novel multi-task learning (mtl) model for personalized recommendations", Proceedings of the 14th ACM Conf. on Recommender Systems, Sep. 2020, pp. 269-278 (Year: 2020).*
"Goal Based Bidding by Objective", Snapchat Business Help Center, [Online]. Retrieved from the Internet: <URL: https://businesshelp.snapchat.com/s/article/goal-basedbidding?language=en_US>, (Retrieved on Aug. 18, 2025), 6 pgs.

(Continued)

*Primary Examiner* — Scott C Anderson
(74) *Attorney, Agent, or Firm* — Schwegman Lundberg & Woessner, P.A.

(57) ABSTRACT

The systems and techniques described herein relate to predicting user conversions in online advertising. Input data associated with user and advertisement features may be processed through neural networks to generate embedding representations or feature cross representations. A multi-task layer calculates probabilities associated with multiple user actions like clicks, page views, sign-ups, or purchases. Click-through and view-through conversion probabilities may be calculated to generate a score. The systems and techniques described herein perform predictions on multiple types of user actions despite data sparsity and negative transfer challenges, enhancing advertisement targeting and improving conversion metrics.

20 Claims, 9 Drawing Sheets

(56)  References Cited

OTHER PUBLICATIONS

Chang, Jianxin, et al., "PEPNet: Parameter and Embedding Personalized Network for Infusing with Personalized Prior Information", arXiv preprint, arXiv:2302.01115v3 [cs.IR], (Jun. 27, 2023), 10 pgs.

Cheng, Heng-Tze, et al., "Wide & Deep Learning for Recommender Systems", ACM DLRS 'Sep. 16, 15, 2016, Boston, MA, USA, (2016), 4 pgs.

Kendall, et al., "Multi-task learning using uncertainty to weigh losses for scene geometry and semantics", CVPR, (2018), 14 pgs.

Ma, Jiaqi, et al., "Modeling Task Relationships in Multi-task Learning with Multi-gate Mixture-of-Experts", KDD 2018, London, UK, (Aug. 19-23, 2018), 1930-1939.

Ma, Xiao, et al., "Entire Space Multi-Task Model: An Effective Approach for Estimating Post-Click Conversion Rate", arXiv preprint, arXiv:1804.07931v2 [stat.ML], (Apr. 24, 2018), 4 pgs.

Tang, Hongyan, "Progressive Layered Extraction (PLE): A Novel Multi-Task Learning (MTL) Model for Personalized Recommendations", RecSys '20: Fourteenth ACM Conference on Recommender Systems, (Sep. 2020), 269-278.

Wang, Ruoxi, et al., "DCN V2: Improved Deep & Cross Network and Practical Lessons for Web-scale Learning to Rank Systems", arXiv:2008.13535v2 [cs.IR], (Oct. 20, 2020), 14 pgs.

* cited by examiner

USER CONVERSION PREDICTION USING A MULTI-TASK MODEL

TECHNICAL FIELD

Examples of the present disclosure relate generally to content filtering systems. More particularly, but not by way of limitation, examples of the present disclosure relate to a recommender system that aims to boost user conversion metrics.

BACKGROUND

A recommender system is software that analyzes user data and behavior to suggest relevant content. On social media platforms, recommender systems curate personalized feeds by displaying posts, videos, or advertisement aligned with interests and past interactions of users, enhancing user engagement.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
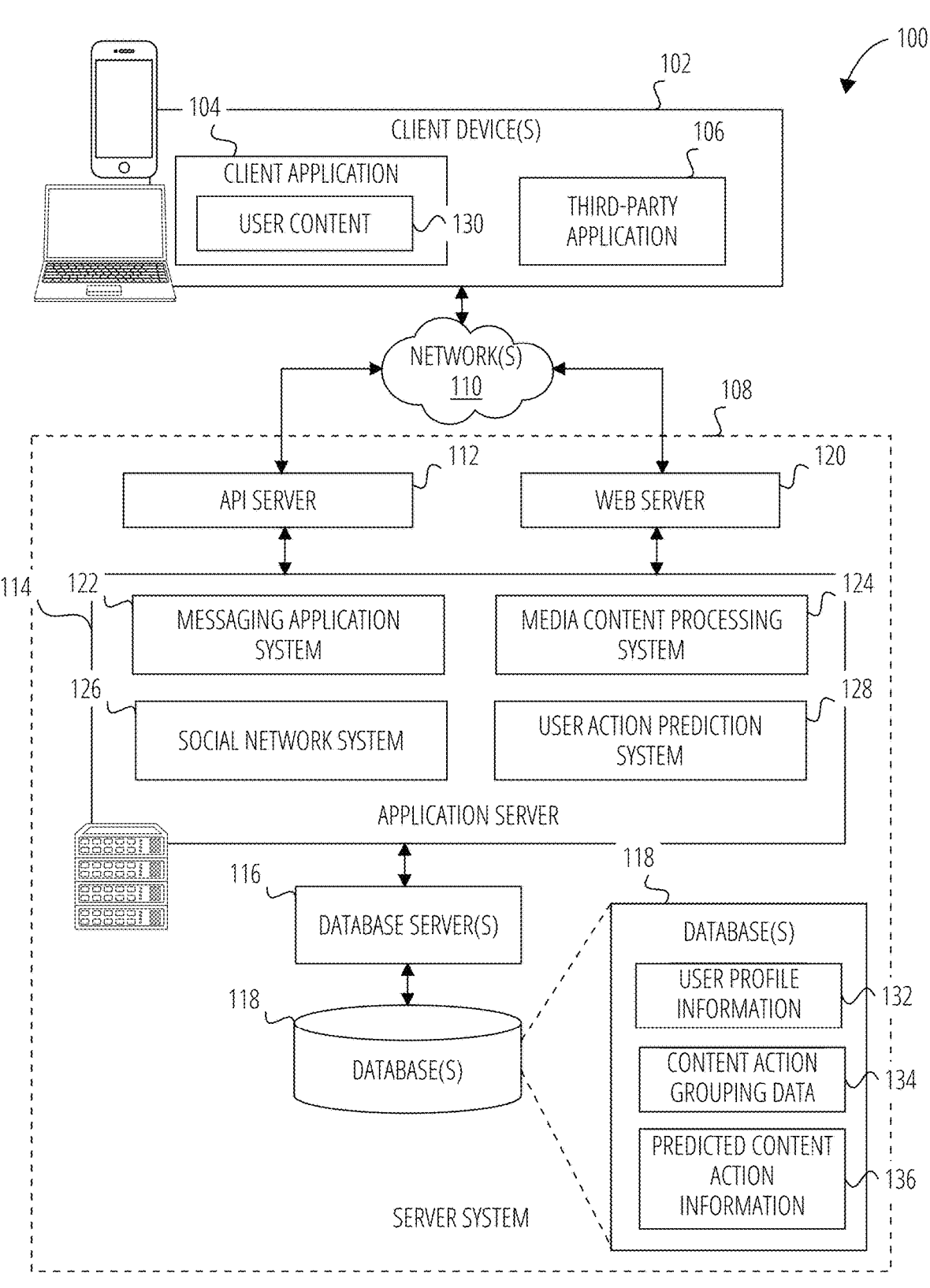
FIG. 1 is a diagrammatic representation of a networked environment in which the present disclosure may be deployed, according to some examples.

Users of interaction applications may perform one or more actions with respect to content that is accessible using interaction applications. In some examples, users cause at least one of video content or audio content to play within a interaction application. Content may also be shared between users of interaction applications. In some examples, items may be purchased using a interaction application or other third-party applications (e.g., third-party application 106). The items may be related to content that is accessible using the interaction application. For example, an item may be shown in an advertisement displayed in the interaction application.

In some examples, the actions that may be performed with respect to content may be specified by one or more entities. For example, a creator of content that is accessible via a interaction application may specify actions that may be performed with respect to content that is produced by the creator. In some examples, the actions performed in relation to content accessible via a interaction application may be monitored. In this way, providers of content, creators of content, or both may be able to identify actions that users perform with respect to their content. In at least some examples, at least one of the providers of content or creators of content may identify characteristics of users of interaction applications that perform one or more actions with respect to the content associated with the providers or creators.

Advertisement may be accessible via a interaction application. The advertisement may include at least one of video content, audio content, or text content. In some examples the advertisement may be provided in association with content items that are accessible using the interaction application. In some examples, the advertisement may be provided with respect to social networking content accessible via the interaction application. In some examples, the advertisement may be provided in association with augmented reality content accessible using the interaction application.

One or more user actions may be performed by users of a interaction application with respect to advertisement. In some examples, the number of actions includes viewing the advertisement, interacting with the advertisement (e.g., clicking, swiping, performing gesture), purchasing items in response to accessing the advertisement (e.g., purchase), adding one or more items to a cart of a user for future purchase in response to accessing the advertisement (e.g., add-to-cart), signing up for an account or a service that is related to the advertisement (e.g., sign-up), one or more combinations thereof, and the like.

In some examples, the advertisement may be related to a third-party application 106 that is different from the interaction application that is making the advertisement accessible to users. A third-party application 106 may be executable from within the interaction application. In at least some of these situations, the third-party application 106 may provide functionality that is complementary to the functionality of the interaction application. The third-party application 106 may also be executable separately from the interaction application. In at least some of these scenarios, the third-party application 106 may have functionality that is different from functionality of the interaction application. In some examples, the one or more user actions that may be performed by a user in relation to the third-party application 106 and in response to the advertisement may include signing up for an account related to the third-party application 106, adding an item to a cart for future purchase, and purchasing via the additional interaction application.

In the field of online advertising, attribution models determines the effectiveness of ad campaigns. Traditionally, many platforms use a "last touch" or "last click" model to attribute conversions to specific ad interactions. However, a more comprehensive approach utilizes both click-through conversions (CTC) and view-through conversions (VTC) to capture a broader range of user conversions. This approach, referred to as first-party (1p) data, provides advertisers with a more holistic view of their ad performance.

Despite the advantages of this approach, a significant challenge arises from the discrepancy between 1p and third-party (3p) reporting. Some advertisers rely on third-party analytics platforms that typically use last-click attribution models. This difference in methodology creates a gap between 1p and 3p conversion reports, potentially affecting advertisers' perceptions of campaign performance and return on investment (ROI). The number of deep actions (conversions) is importance to advertisers, as higher conversion rates with the same budget translate to improved ROI. These performance metrics may influence advertisers' decisions on budget allocation across various advertising platforms.

To address this complex landscape, several challenges need to be addressed. First, user engagement varies based on individual interests in ad types, such as sports or entertainment ads. Second, improving user behaviors in response to advertisements, particularly purchase behaviors, can significantly enhance advertisers' ROI. Third, higher ROI for advertisers attracts more advertisers to the advertising platform, thereby increasing overall revenue for the advertising platform. Fourth, boosting both click-through conversions (CTC) and view-through conversions (VTC) metrics, thereby improving advertisers' performance based on 1p data and 3p data. However, addressing this fourth challenge proves particularly difficult due to the high inference cost associated with different attribution windows for each task per model.

To overcome these challenges, we propose a novel multi-task model based on the entire space with advanced multi-task algorithms. This novel multi-task model aims to lower the cost per conversion (CPC), improve ROI for advertisers, and enhance user engagement. By integrating CTC and VTC optimization within a unified multi-task model, the advertising platform can provide a more accurate representation of the performance while addressing the discrepancies between 1p and 3p reporting.

Conventional systems for predicting user conversions in online advertising face several limitations that the systems and techniques describe herein aim to address. Traditional approaches often struggle with data sparsity, negative transfer between tasks, and the inability to capture the full spectrum of user interactions.

One key limitation of conventional systems is their reliance on separate models for click-through conversions (CTC) and view-through conversions (VTC), causing high inference costs and potential inconsistencies in predictions. The systems and techniques describe herein address this by integrating both CTC and VTC into a single multi-task model, reducing inference costs compared to using separate models for each task.

Conventional systems also often fail to effectively capture the complex interactions between user behaviors and ad features. The systems and techniques describe herein employ a modified Deep & Cross Network (DCN) v2 as a feature interaction layer, which enhances user engagement and improves the input layer. By using high-order feature interactions (up to order five), the systems and techniques describe herein can better capture sparse user behaviors and create more effective embedding representations for ads and user behavior interactions.

Layer normalization may be performed in each cross layer of the DCN v2 model, enhancing model performance by reducing the impact of large feature values or outliers, particularly in high-order cross layers, which allows for a more balanced consideration of other features.

Another limitation of traditional approaches may be their inability to handle multiple tasks simultaneously while preventing negative transfer and seesaw phenomena. The systems and techniques describe herein address this by using a modified novel multi-task learning architecture that incorporates Multi-gate Mixture-of-Experts (MMoE) and Progressive Layered Extraction (PLE), allowing for the assignment of different numbers of experts to different tasks, mitigating negative transfer and improving overall model performance.

Conventional systems may struggle with personalization and capturing diverse user engagement behaviors. The systems and techniques describe herein employ different towers for different tasks, allowing the model to better capture various user engagement behaviors.

The systems and techniques describe herein allow for task-specific weight tuning based on different tasks. By incorporating uncertainty loss in the multi-task model, we can fine-tune the performance for various aspects of user behavior prediction. This adaptive weighting mechanism may allow the system to optimize the performance across different tasks, giving more importance to certain tasks when necessary. For example, by lowering the CTC loss in the multi-task model, we can potentially boost the performance of other conversion prediction.

The systems, methods, techniques, instruction sequences, and computing machine program products described herein are directed to determining groups of content actions that are related and computational models that are executable to determine probabilities of users of a interaction application performing the one or more user actions for given content items. The machine learning architectures described herein may include the same or similar components, but may have different parameters, weights, coefficients, and the like due to the individual machine learning architectures being trained using different training data sets.

FIG. 1 is a diagrammatic representation of an architecture 100 for exchanging data (e.g., messages and associated content) over a network, according to some examples. The architecture 100 may include multiple client devices 102. The client devices 102 may individually comprise, but are not limited to, a mobile phone, a desktop computer, a laptop computing device, a portable digital assistant (PDA), smart phone, tablet computing device, ultrabook, netbook, multi-processor system, microprocessor-based or programmable consumer electronic system, game console, set-top box, computer in a vehicle, a wearable device, one or more combinations thereof, or any other communication device that a user may utilize to access one or more components included in the architecture 100.

Each client device 102 may host a number of applications, including an interaction application 104 and one or more third-party applications 106. A user may use the interaction application 104 to create content, such as video, images (e.g., photographs), audio, and media overlays. In one or more illustrative examples, the interaction application 104 may include a social networking functionality that enables users to create and exchange content. In various examples, the interaction application 104 may include messaging functionality that may be used to send messages between instances of the interaction application 104 executed by various client devices 102. The messages created using the interaction application 104 may include video, one or more images, audio, media overlays, text, content produced using one or more creative tools, annotations, and the like. In one or more implementations, the interaction application 104 may be used to view and generate interactive messages, view locations of other users of the interaction application 104 on a map, chat with other users of the interaction application 104, and so forth.

One or more users may be a person, a machine, or other means of interacting with a client device, such as the client device 102. In example implementations, the user may not be part of the architecture 100 but may interact with one or more components of the architecture 100 via a client device 102 or other means. In various examples, users may provide input (e.g., touch screen input or alphanumeric input) to a client device 102 and the input may be communicated to other entities in the architecture 100. In this instance, the other entities in the architecture 100, responsive to the user input, may communicate information to a client device 102 to be presented to the users. In this way, users may interact with the various entities in the architecture 100 using the client device 102.

Each instance of the interaction application 104 is able to communicate and exchange data with at least one of another instance of the interaction application 104, one or more third-party applications 106, or a server system 108. The data exchanged between instances of the interaction applications 104, between the third-party applications 106, and between instances of the interaction application 104 and the server system 108 includes functions (e.g., commands to invoke functions) and payload data (e.g., text, audio, image, video, or other multimedia data). Data exchanged between instances of the interaction applications 104, between the third-party applications 106, and between at least one instance of the interaction application 104 and at least one third-party application 106 may be exchanged directly from an instance of an application executed by a client device 102 and an instance of an application executed by an additional client device 102. Further, data exchanged between the interaction applications 104, between the third-party applications 106, and between at least one interaction application 104 and at least one third-party application 106 may be communicated indirectly (e.g., via one or more intermediate servers) from an instance of an application executed by a client device 102 to another instance of an application executed by an additional client device 102. In one or more illustrative examples, the one or more intermediate servers used in indirect communications between applications may be included in the server system 108.

The third-party application 106 may be separate and distinct from the interaction application 104. The third-party application 106 may be downloaded and installed by the client device 102 separately from the interaction application 104. In various implementations, the third-party application 106 may be downloaded and installed by the client device 102 before or after the interaction application 104 is downloaded and installed. The third-party application 106 may be an application that is provided by an entity or organization that is different from the entity or organization that provides the interaction application 104. The third-party application 106 may be accessed by the client device 102 using separate login credentials than the interaction application 104. Namely, the third-party application 106 may maintain a first user account and the interaction application 104 may maintain a second user account. In one or more implementations, the third-party application(s) 106 may be accessed by the client device 102 to perform various activities and interactions, such as listening to music, videos, track exercises, view graphical elements (e.g., stickers), communicate with other users, and so forth. As an example, the third-party application(s) 106 may include a social networking application, a dating application, a ride or car sharing application, a shopping application, a trading application, a gaming application, an imaging application, a music application, a video browsing application, an exercise tracking application, a health monitoring application, a graphical element or sticker browsing application, or any other suitable application.

The server system 108 provides server-side functionality via one or more networks 110 to the interaction application 104. The server system 108 may be a cloud computing environment, according to some example implementations. For example, the server system 108, and one or more servers associated with the server system 108, may be associated with a cloud-based application, in one illustrative example. In one or more implementations, the client device 102 and the server system 108 may be coupled via the one or more networks 110.

The server system 108 supports various services and operations that are provided to the interaction application 104. Such operations include transmitting data to, receiving data from, and processing data generated by the interaction application 104. This data may include message content, media content, client device information, geolocation information, media annotation and overlays, message content persistence conditions, social network information, and live event information, as examples. Data exchanges within the architecture 100 are invoked and controlled through functions available via user interfaces (UIs) of the interaction application 104.

While certain functions of the architecture 100 are described herein as being performed by either an interaction application 104 or by the server system 108, the location of functionality either within the interaction application 104 or the server system 108 is a design choice. For example, it may be technically preferable to initially deploy certain technology and functionality within the server system 108, but to later migrate this technology and functionality to the interaction application 104 where a client device 102 has a sufficient processing capacity.

The server system 108 includes an Application Programming Interface (API) server 112 that is coupled to, and provides a programmatic interface to, an application server 114. The application server 114 is communicatively coupled to a database server 116 that facilitates access to one or more databases 118. The one or more databases 118 may store data associated with information processed by the application server 114. The one or more databases 118 may be storage devices that store information such as untreated media content, original media content from users (e.g., high-quality media content), processed media content (e.g., media content that is formatted for sharing with client devices 102 and viewing on client devices 102), context data related to a media content, context data related to a user device (e.g., a computing or client device 102), media overlays, media overlay smart widgets or smart elements, user data, user device information, media content (e.g., video and images), media content data (e.g., data associated with video and images), computing device context data, serialized data, session data items, user device location data, mapping information, interactive message usage data, interactive message metrics data, and so forth. The one or more databases 118 may further store information related to third-party servers, client devices 102, interaction applications 104, users, third-party applications 106, and so forth.

The API server 112 receives and transmits data (e.g., commands and message payloads) between client devices 102 and the application server 114. Specifically, the Application Program Interface (API) server 112 provides a set of interfaces (e.g., routines and protocols) that can be called or queried by the interaction application 104 in order to invoke functionality of the application server 114. The Application Program Interface (API) server 112 exposes various functions supported by the application server 114, including account registration, login functionality, the sending of messages, via the application server 114, from one instance of the interaction application 104 to another instance of the interaction application 104, the sending of media files (e.g., images, audio, video) from an interaction application 104 to the application server 114, and for possible access by another interaction application 104, the setting of a collection of media content (e.g., a gallery, story, message collection, or media collection), the retrieval of a list of friends of a user of a client device 102, the retrieval of such collections, the retrieval of messages and content, the adding and deletion of friends to a social graph, the location of friends within a social graph, and opening an application event (e.g., relating to the interaction application 104).

The server system 108 may also include a web server 120. The web server 120 is coupled to the application servers 114 and provides web-based interfaces to the application servers 114. To this end, the web server 120 processes incoming network requests over the Hypertext Transfer Protocol (HTTP) and several other related protocols.

The application server 114 hosts a number of applications and subsystems, including a messaging application system 122, a media content processing system 124, a social network system 126, and a user action prediction system 128. The messaging application system 122 implements a number of message processing technologies and functions, particularly related to the aggregation and other processing of content (e.g., textual and multimedia content) included in messages received from multiple instances of the interaction application 104. For example, the messaging application system 122 may deliver messages using electronic mail (email), instant messaging (IM), Short Message Service (SMS), text, facsimile, or voice (e.g., Voice over IP (VOIP)) messages via wired networks (e.g., the Internet), plain old telephone service (POTS), or wireless networks (e.g., mobile, cellular, WIFI, Long Term Evolution (LTE), or Bluetooth). The messaging application system 122 may aggregate text and media content from multiple sources into collections of content. These collections are then made available, by the messaging application system 122, to the interaction application 104. Other processor- and memory-intensive processing of data may also be performed server-side by the messaging application system 122, in view of the hardware requirements for such processing.

The media content processing system 124 is dedicated to performing various media content processing operations, typically with respect to images, audio, or video received within the payload of a message or other content at the messaging application system 122. The media content processing system 124 may access one or more data storages (e.g., the database(s) 118) to retrieve stored data to use in processing media content and to store results of processed media content.

The social network system 126 supports various social networking functions and services and makes these functions and services available to the messaging application system 122. To this end, the social network system 126 maintains and accesses an entity graph within the database(s) 118. Examples of functions and services supported by the social network system 126 include the identification of other users of the interaction application 104 with which a particular user has relationships or is "following", and also the identification of other entities and interests of a particular user. The social network system 126 may access location information associated with each of the user's friends or other social network connections to determine where they live or are currently located geographically. In addition, the social network system 126 may maintain a location profile for each of the user's friends indicating the geographical location where the user's friends live.

The user action prediction system 128 may determine probabilities of users performing actions with respect to content items that are accessible via the interaction application 104. In one or more examples, the content items may include user content 130. The user content 130 may be generated by one or more users of the interaction application 104. The user content 130 may include at least one of image content, video content, text content, or augmented reality content that is accessible using the interaction application 104. In various examples, the user content 130 may be captured by one or more input devices of a client device 102, such as one or more cameras or one or more microphones of the client device 102. In one or more examples, the user content 130 may include a live camera view captured by one or more cameras of the client device 102. In one or more additional examples, the user content 130 may include content previously captured by one or more input devices of a client device 102. For example, the user content 130 may have been previously captured by one or more input devices of the client device 102 and stored in memory accessible to the client device 102. The memory may be included within a housing of the client device 102 or located remotely with respect to the client device 102. In situations where the memory storing the user content 130 is located remotely with respect to the client device 102, the memory may be accessible to the client device 102 via the one or more networks 110. To illustrate, the user content 130 may be stored in one or more cloud-based storage devices that are accessible to the client device 102 via the one or more networks 110. In one or more illustrative examples, the user content 130 may be stored by the one or more databases 118. In one or more additional examples, the actions may be performed in relation to advertisement that is accessible via the interaction application 104. In one or more further examples, the actions may be performed in relation to advertisement that is accessible in relation to user content 130. For example, as users of the interaction application 104 access one or more content items that are included in the user content 130, one or more advertisements may also be displayed or otherwise accessible to the users of the interaction application 104.

The user action prediction system 128 may execute one or more machine learning architectures to determining probabilities of users of the interaction application 104 performing one or more actions with respect to one or more content items. The one or more machine learning architectures may include a feature extraction layer. In one or more illustrative examples, the feature extraction layer may include a deep and cross network model. Additionally, the user action prediction system 128 may include one or more extraction layers. Individual extraction layers may include a number of computational experts models. The computational experts models included in the individual extraction layers may include one or more computational experts models that correspond to a given action being predicted. For example, an individual extraction layer may include a first set of computational experts models for a first task that is being predicted by the machine learning architecture and a second set of computational experts models for a second task that is being predicted by the machine learning architecture. The individual extraction layers may also include one or more shared computational experts models that correspond to the group of actions being predicted by the machine learning architecture. In various examples, the individual extraction layers may also include one or more gating networks. The one or more gating networks may analyze input from one or more of the computational experts models. In one or more illustrative examples, the one or more gating networks may include multiple softmax layers. The use of multiple softmax layers may balance the results obtained from the computational experts models in relation to existing systems. That is, in existing systems, as the output for computational experts models for a first task achieve improved accuracy, the output for computational experts models for a second task may decrease in accuracy. The use of multiple softmax functions in individual gating networks may result in improved balance of results provided by the computational experts models and result in improved accuracy of predictions made by the computational experts models corresponding to multiple tasks.

The user action prediction system 128 may analyze user profile information 132 stored by the one or more databases 118 to train the machine learning architectures of the user action prediction system 128. The user profile information 132 may include characteristics of users of the interaction application 104. The characteristics of the users included in the user profile information 132 may include usage history of the interaction application 104. For example, the user profile information 132 may indicate content that has been previously accessed by the users of the interaction application 104. The user profile information 132 may also indicate amounts of time that content was viewed by users of the interaction application 104. Additionally, the user profile information 132 may indicate location data related to users of the interaction application 104. Further, the user profile information 132 may include demographic information of users of the interaction application 104. The training of the machine learning architectures included in the user action prediction system 128 may determine characteristics of users of the interaction application 104 in relation to a likelihood of the users to take one or more actions with respect to at least one of one or more content items or one or more classifications of content items. The training of the machine learning architectures included in the user action prediction system 128 may determine at least one of parameters, weights, coefficients, or other components of one or more models of the machine learning architectures included in the user action prediction system 128.

In various examples, the machine learning architectures of the user action prediction system 128 may be trained using historical data obtained from users of the interaction application 104 that indicates users that previously performed one or more actions with respect a content. For example, training data for the machine learning architectures of the user action prediction system 128 may indicate users that added an item to their cart in response to accessing an advertisement related to the item. The training data for the machine learning architectures of the user action prediction system 128 may also indicate users that viewed a page of an item included in the advertisement for the item or that purchased the item included in the advertisement. During the training process, characteristics of users that performed one or more actions may be analyzed to generate machine learning models of the user action prediction system 128 that predict the probability of additional users performing the actions based on the characteristics of the additional users.

The one or more databases 118 may also store content action grouping data 134. The content action grouping data 134 may indicate groups of actions that may be performed in relation to content accessible using the interaction application 104. The actions included in individual content action groupings may be correlated with one another. In one or more examples, the user action prediction system 128 may determine correlations between actions that may be performed with respect to content that is accessible using the interaction application 104 and group the actions based on a measure of correlation between the respective actions. In one or more additional examples, predetermined groupings of content actions may be obtained from at least one of content creators, content providers, or administrators of the server system 108. In one or more examples, the content action grouping data 134 may indicate a first group of content actions that are correlated with one another, a second group of content actions that are correlated with one another, and a third group of content actions that are correlated with one another. The use of groups of actions that are correlated with one another in relation to the user action prediction system 128 may reduce the presence of negative transfer that is present in existing systems.

In one or more illustrative examples, the content action grouping data 134 may group actions that may be performed with respect to advertisement. To illustrate, the content action grouping data 134 may include a first content action grouping that includes a page view related to an advertisement, a purchase of an item that corresponds to the advertisement, adding an item corresponding to an advertisement to the cart of a user of the interaction application 104 for a potential purchase of the item, and a sign up by a user of the interaction application 104 in relation to an account, promotions, and the like related to items that correspond to the advertisement. In one or more additional illustrative examples, the content action grouping data 134 may include a second content action grouping that is related to actions that may be performed with regard to additional interaction applications that may be obtained using the interaction application 104 or accessed within the interaction application 104. For example, the content action grouping data 134 can include a group of actions that correspond to purchase of an additional interaction application that corresponds to an advertisement, adding an additional interaction application related to an advertisement to the cart of a user for a potential future purchase, and a sign up in relation to an account associated with an interaction application 104 that is associated with an advertisement.

Further, the content action grouping data 134 can include a third content action grouping that corresponds to video content. In at least some examples, the content action grouping data 134 can include a content action group that includes at least one of a content action related to viewing video content for at least two seconds, a content action related to viewing the video content for at least 5 seconds, a content action related to viewing the video content for at least 8 seconds, a content action related to viewing the video content for at least 10 seconds, a content action related to viewing the video content for at least 12 seconds, a content action related to viewing the video content for at least 15 seconds, a content action related to viewing the video content for at least 18 seconds, or a content action related to viewing the video content for at least 20 seconds. In various examples, the video content may comprise or otherwise be accessible in relation to advertisement.

In one or more examples, the user action prediction system 128 may include individual machine learning architectures that correspond to individual content action groupings. For example, the user action prediction system 128 may include a first machine learning architecture that is trained to determine probabilities of users of the interaction application 104 performing individual actions included in the first content action grouping and a second machine learning architecture that is trained to determine probabilities of users of the interaction application 104 performing individual actions included in the second content action grouping. In various examples, the user action prediction system 128 may include a machine learning architecture that is trained to determine probabilities of users of the interaction application 104 performing individual actions included in the third content action grouping.

In various examples, the one or more databases 118 may store predicted content action information 136. The predicted content action information 136 may include probabilities of users accessing content items that were previously determined by the user action prediction system 128. In one or more examples, the user action prediction system 128 may execute one or more machine learning architectures to determine probabilities of a group of users of the interaction application 104 performing one or more actions included in one or more content items action groupings. In these scenarios, the user action prediction system 128 may cause content items to be accessible to a user of the interaction application 104 during use of the interaction application that correspond to at least a threshold probability of the user performing one or more actions related to the content. In at least some situations, the predicted content action information 136 may be updated periodically, such as within a specified amount of time since a previous determination of content action probabilities by the user action prediction system 128 for a given user of the interaction application 104. The predicted content action information 136 may also be updated in response to users of the interaction application 104 initiating execution of new instances of the interaction application 104, such as opening the interaction application 104 using the client device 102.

In one or more illustrative examples, as a user of the interaction application 104 is navigating through content using the interaction application 104, the user action prediction system 128 may determine that the user has at least a threshold probability of performing one or more actions with respect to a content. In these scenarios, the user action prediction system 128 may make the content accessible to the user, such as by displaying the content in a user interface of the interaction application 104 or providing a link to the content. In one or more additional illustrative examples, a user of the interaction application 104 may be viewing or otherwise accessing content via the interaction application 104 and the user action prediction system 128 may determine that the content is associated with one or more additional content items, such as one or more advertisements. To illustrate, at least a portion of the content or classifications of content accessible via the interaction application 104 may be associated with one or more advertising items. The user action prediction system 128 may analyze user profile information 132 of the user to determine an advertisement related to the content being viewed by the user. For example, a user may be viewing at least one of social networking content, message content, or other content accessible via the interaction application 104 and the user action prediction system 128 may determine that one or more advertisements correspond to the content being accessed by the user. The user action prediction system 128 may then determine probabilities of the user performing actions included in one or more groupings of content actions related to the advertisement with respect to the user. In various examples, the user action prediction system 128 may determine an advertisement associated with one or more actions that have at least a threshold probability of the user performing and cause the advertisement to be accessible to the user via the interaction application 104.

Figure 2:
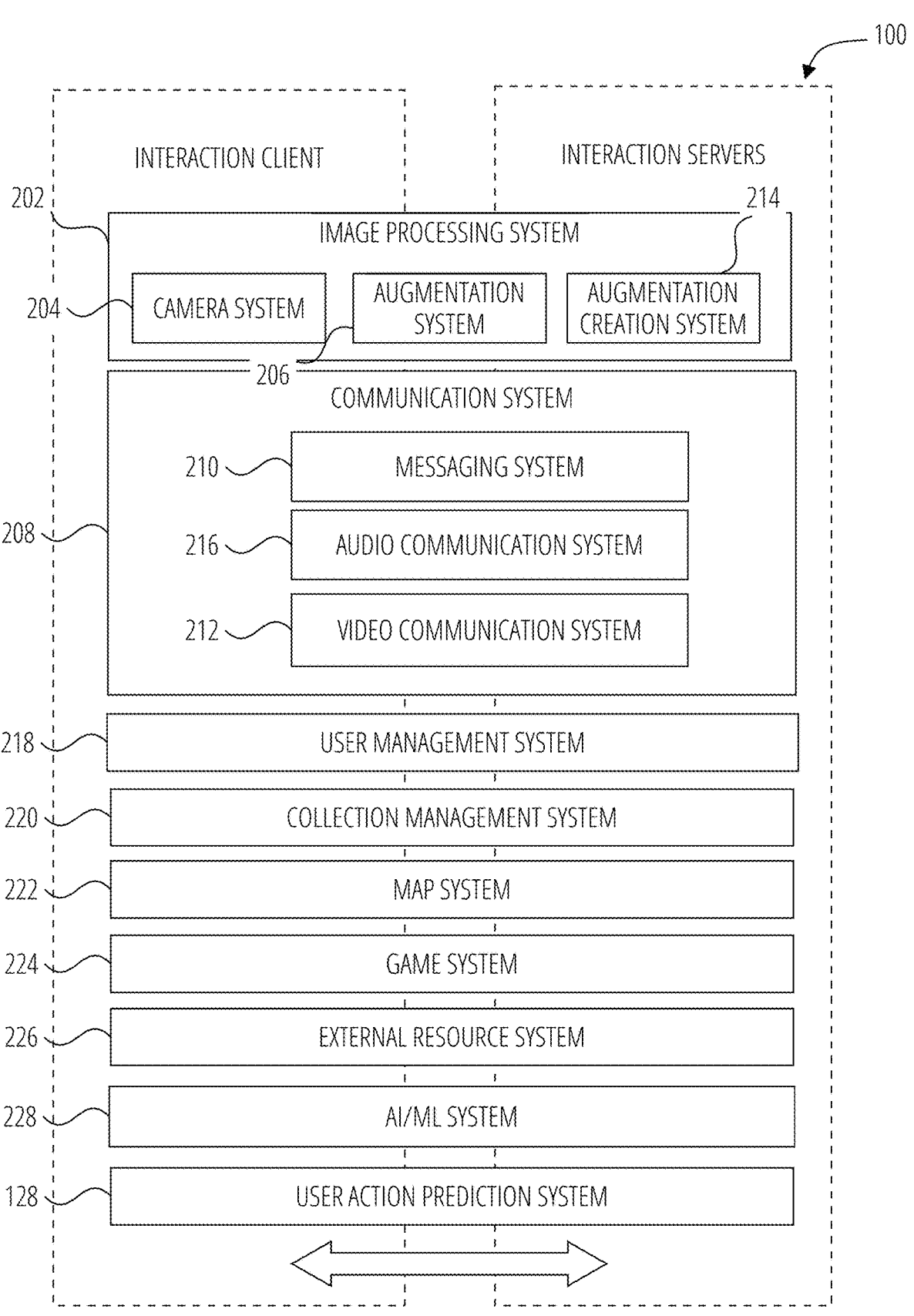
FIG. 2 is a diagrammatic representation of a digital interaction system that has both client-side and server-side functionality, according to some examples.

FIG. 2 is a block diagram illustrating further details regarding the interaction system 100, according to some examples. Specifically, the interaction system 100 is shown to comprise the interaction client 102 and the interaction servers 102. The interaction system 100 may include multiple subsystems, which are supported on the client-side by the interaction client 102 and on the server-side by the interaction servers 102. In some examples, these subsystems are implemented as microservices. A microservice subsystem (e.g., a microservice application) may have components that enable it to operate independently and communicate with other services. Example components of microservice subsystem may include:

Function logic: The function logic implements the functionality of the microservice subsystem, representing a specific capability or function that the microservice provides.

API interface: Microservices may communicate with each other components through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 104 and database 104). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture:

Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 102.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 102 for the augmentation of real-time images received via the camera system 204 or stored images retrieved from memory 702 of a user system 102. These augmentations are selected by the augmentation system 206 and presented to a user of an interaction client 102, based on a number of inputs and data, such as for example:

Geolocation of the user system 102; and

Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content (e.g., a photo or video) at user system 102 for communication in a message, or applied to video content, such as a video content stream or feed transmitted from an interaction client 102. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 104 and accessed through the database server 104.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 102. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system

216, and a video communication system 212. The messaging system 210 is responsible for enforcing the temporary or time-limited access to content by the interaction clients 102. The messaging system 210 incorporates multiple timers (e.g., within an ephemeral timer system) that, based on duration and display parameters associated with a message or collection of messages (e.g., a story), selectively enable access (e.g., for presentation and display) to messages and associated content via the interaction client 102. The audio communication system 216 enables and supports audio communications (e.g., real-time audio chat) between multiple interaction clients 102. Similarly, the video communication system 212 enables and supports video communications (e.g., real-time video chat) between multiple interaction clients 102.

A user management system 218 is operationally responsible for the management of user data and profiles, and maintains entity information (e.g., stored in entity tables 304, entity graphs 306 and profile data 308) regarding users and relationships between users of the interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 102. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

A map system 222 provides various geographic location (e.g., geolocation) functions and supports the presentation of map-based media content and messages by the interaction client 102. For example, the map system 222 enables the display of user icons or avatars (e.g., stored in profile data 308) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 102. A user can furthermore share his or her location and status information (e.g., using an appropriate status avatar) with other users of the interaction system 100 via the interaction client 102, with this location and status information being similarly displayed within the context of a map interface of the interaction client 102 to selected users.

A game system 224 provides various gaming functions within the context of the interaction client 102. The interaction client 102 provides a game interface providing a list of available games that can be launched by a user within the context of the interaction client 102 and played with other users of the interaction system 100. The interaction system 100 further enables a particular user to invite other users to participate in the play of a specific game by issuing invitations to such other users from the interaction client 102. The interaction client 102 also supports audio, video, and text messaging (e.g., chats) within the context of gameplay, provides a leaderboard for the games, and also supports the provision of in-game rewards (e.g., coins and items).

An external resource system 226 provides an interface for the interaction client 102 to communicate with remote servers (e.g., third-party servers 102) to launch or access external resources, i.e., applications or applets. Each third-party server 102 hosts, for example, a markup language (e.g., HTML5) based application or a small-scale version of an application (e.g., game, utility, payment, or ride-sharing application). The interaction client 102 may launch a web-based resource (e.g., application) by accessing the HTML5 file from the third-party servers 102 associated with the web-based resource. Applications hosted by third-party servers 102 are programmed in JavaScript leveraging a Software Development Kit (SDK) provided by the interaction servers 102. The SDK includes Application Programming Interfaces (APIs) with functions that can be called or invoked by the web-based application. The interaction servers 102 host a JavaScript library that provides a given external resource access to specific user data of the interaction client 102. HTML5 is an example of technology for programming games, but applications and resources programmed based on other technologies can be used.

To integrate the functions of the SDK into the web-based resource, the SDK is downloaded by the third-party server 102 from the interaction servers 102 or is otherwise received by the third-party server 102. Once downloaded or received, the SDK is included as part of the application code of a web-based external resource. The code of the web-based resource can then call or invoke certain functions of the SDK to integrate features of the interaction client 102 into the web-based resource.

The SDK stored on the interaction server system 102 effectively provides the bridge between an external resource (e.g., applications 102 or applets) and the interaction client 102. This gives the user a seamless experience of communicating with other users on the interaction client 102 while also preserving the look and feel of the interaction client 102. To bridge communications between an external resource and an interaction client 102, the SDK facilitates communication between third-party servers 102 and the interaction client 102. A bridge script running on a user system 102 establishes two one-way communication channels between an external resource and the interaction client 102. Messages are sent between the external resource and the interaction client 102 via these communication channels asynchronously. Each SDK function invocation is sent as a message and callback. Each SDK function is implemented by constructing a unique callback identifier and sending a message with that callback identifier.

By using the SDK, not all information from the interaction client 102 is shared with third-party servers 102. The SDK limits which information is shared based on the needs of the external resource. Each third-party server 102 provides an HTML5 file corresponding to the web-based external resource to interaction servers 102. The interaction servers 102 can add a visual representation (such as a box art or other graphic) of the web-based external resource in the interaction client 102. Once the user selects the visual representation or instructs the interaction client 102 through a GUI of the interaction client 102 to access features of the web-based external resource, the interaction client 102 obtains the HTML5 file and instantiates the resources to access the features of the web-based external resource.

The interaction client 102 presents a graphical user interface (e.g., a landing page or title screen) for an external resource. During, before, or after presenting the landing page or title screen, the interaction client 102 determines whether the launched external resource has been previously authorized to access user data of the interaction client 102. In response to determining that the launched external resource has been previously authorized to access user data of the interaction client 102, the interaction client 102 presents another graphical user interface of the external resource that includes functions and features of the external resource. In response to determining that the launched external resource has not been previously authorized to access user data of the interaction client 102, after a threshold period of time (e.g., 3 seconds) of displaying the landing page or title screen of the external resource, the interaction client 102 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 102 adds the external resource to a list of authorized external resources and allows the external resource to access user data from the interaction client 102. The external resource is authorized by the interaction client 102 to access the user data under an OAuth 2 framework.

The interaction client 102 controls the type of user data that is shared with external resources based on the type of external resource being authorized. For example, external resources that include full-scale applications (e.g., an application 102) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An artificial intelligence and machine learning system 228 provides a variety of services to different subsystems within the interaction system 100. For example, the artificial intelligence and machine learning system 228 operates with the image processing system 202 and the camera system 204 to analyze images and extract information such as objects, text, or faces. This information can then be used by the image processing system 202 to enhance, filter, or manipulate images. The artificial intelligence and machine learning system 228 may be used by the augmentation system 206 to generate augmented content and augmented reality experiences, such as adding virtual objects or animations to real-world images. The communication system 208 and messaging system 210 may use the artificial intelligence and machine learning system 228 to analyze communication patterns and provide insights into how users interact with each other and provide intelligent message classification and tagging, such as categorizing messages based on sentiment or topic. The artificial intelligence and machine learning system 228 may also provide chatbot functionality to message interactions 102 between user systems 102 and between a user system 102 and the interaction server system 102. The artificial intelligence and machine learning system 228 may also work with the audio communication system 216 to provide speech recognition and natural language processing capabilities, allowing users to interact with the interaction system 100 using voice commands.

A user action prediction system 128 may enable handles the delivery and presentation of advertisements. The user action prediction system 128 may predict a user action associated with an advertisement. In some example, the user action prediction system 128 calculates (e.g., predicts) a probability of a user action associated with the advertisement.

The user action prediction system 128 may include one or more machine learning architectures that analyze user data and advertisement data to determine probabilities of users performing actions that are related to one or more advertisements. The actions may include but not limited to interaction with the advertisement, clicks, page views, sign-ups, or purchases. The user action prediction system 128 may be configured to predict conversions metrics like click-through conversion (CTC) and view-through conversion (VTC). The user action prediction system 128 may operate in conjunction with one or more other systems, such as the collection management system 204, the augmentation system 206, the map system 208, and/or the game system 210, to cause an advertisement to be accessible to the user of the interaction application 104.

Figure 3:
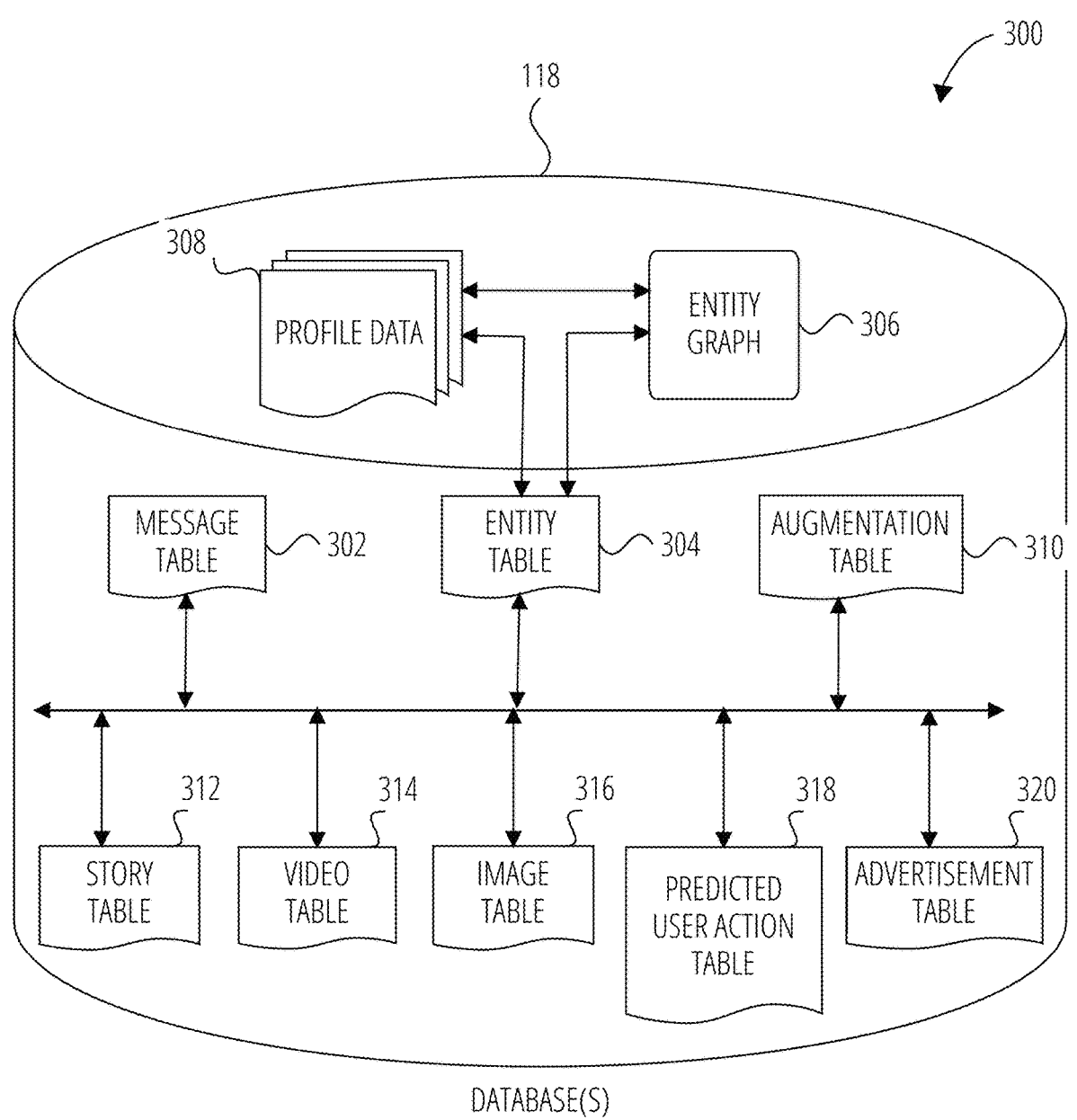
FIG. 3 is a schematic diagram illustrating a data structure as maintained in a database, according to some examples.

FIG. 3 is a schematic diagram illustrating data structures 300 which may be stored in the database(s) 118 of the server system 108, according to some examples. While the content of the database(s) 118 is shown to comprise a number of tables, it will be appreciated that the data could be stored in other types of data structures (e.g., as an object-oriented database).

The database 118 includes message data stored within a message table 302. This message data includes, for any particular one message, at least message sender data, message recipient (or receiver) data, and a payload.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. In one or more examples, the profile data 308 may include at least a portion of the user profile information 132. The profile data 308 may be selectively used and presented to other users of the architecture 100, based on privacy settings specified by a particular entity. Where the entity is an individual, the profile data 308 includes, for example, a username, telephone number, address, settings (e.g., notification and privacy settings), as well as a user-selected avatar representation (or collection of such avatar representations). A particular user may then selectively include one or more of these avatar representations within the content of messages or other data communicated via the architecture 100, and on map interfaces displayed by interaction application 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group. In some examples, the profile data 308 is subset of user data.

The database 118 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the interaction application 104 when the sending user is composing a message. Other types of filters include geolocation filters (also known as geo-filters), which may be presented to a sending user based on geographic location. For example, geolocation filters specific to a neighborhood or special location may be presented within a user interface by the interaction application 104, based on geo-location information determined by a Global Positioning System (GPS) unit of the client device 102.

Another type of filter is a data filter, which may be selectively presented to a sending user by the interaction application 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various implementations, different methods for achieving such transformations may be used. Some examples may involve generating a three-dimensional mesh model of the object or objects and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various implementations, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some implementations, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In various examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In one or more systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

A computer animation model to transform image data can be used by a system where a user may capture an image or video stream of the user (e.g., a selfie) using a client device 102 having a neural network operating as part of an interaction application 104 operating on the client device 102. The transformation system operating within the interaction application 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various implementations, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some implementations, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the interaction application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the interaction application 104, to contribute content to a particular live story. The live story may be identified to the user by the interaction application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

The database(s) 118 may also store a predicted user action table 318. The predicted user action table 318 may indicate probabilities of users of the interaction application 104 performing one or more actions in relation to one or more content items. In one or more examples, the predicted user action table 318 may be accessed periodically to identify one or more content items that are to be accessible to a user of the interaction application 104. In at least some examples, the one or more content items may include advertisements that are displayed to a user. In various examples, the user may be viewing one or more additional content items, such as messages or social networking content, prior to the advertisements being provided to the user and the predicted user action table 318 may be accessed to determine one or more advertisements to provide to the user while the user is viewing the one or more additional content items.

Additionally, the database(s) 118 may store an advertisement table 320. The advertisement table 320 may store advertisements that may be provided to users of the interaction application 104. In one or more examples, the advertisement table 320 may indicate one or more users that correspond to individual advertisement. In various examples, an advertisement may correspond to a user of the interaction application 104 in situations where the user has at least a threshold probability of taking at least one action in relation to the advertisement. In one or more additional examples, the advertisement table 320 may indicate at least one of one or more content items or one or more classifications of content items that correspond to one or more advertisements. For example, the advertisement table 320 may indicate one or more advertisements that may be provided in conjunction with one or more additional content items or one or more classifications of content items. That is, in situations where a user of the interaction application 104 is accessing a given content via the interaction application 104, the advertisement table 320 may indicate one or more advertisements that may be provided while the user is accessing the given content. In one or more illustrative examples, one or more first advertisements may correspond to messaging content, one or more second advertisements may correspond to social networking content, and one or more third advertisements may correspond to augmented reality content items.

Figure 4:
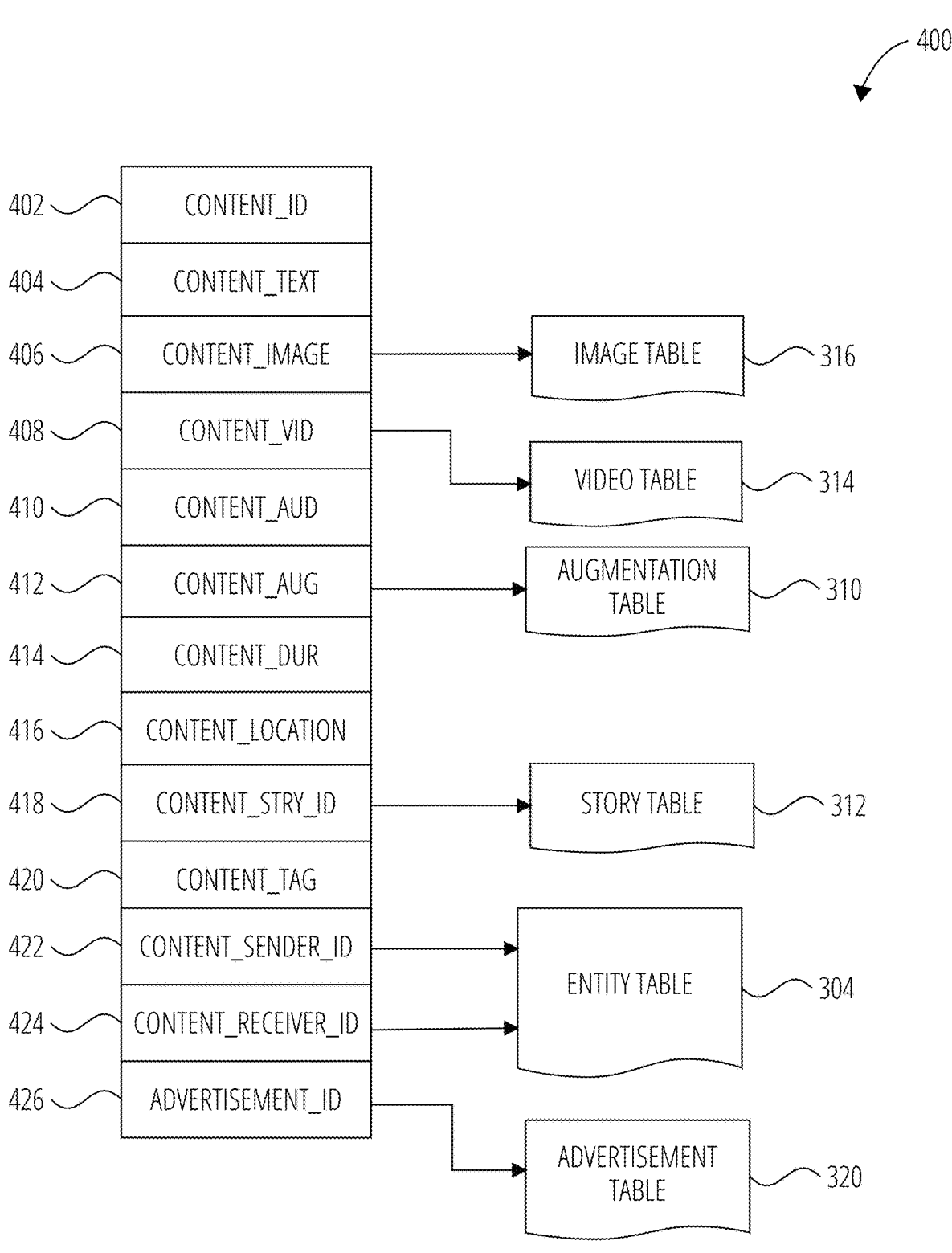
FIG. 4 is a schematic diagram illustrating a structure of a content, according to some examples

FIG. 4 is a schematic diagram illustrating a structure of a content 400, according to some examples, generated by an interaction client 102 for communication to a further interaction client 102 via the interaction servers 102. The content of a particular content 400 is used to populate the message table 302 stored within the database(s) 118, accessible by the interaction servers 102. Similarly, the content of a content 400 is stored in memory as "in-transit" or "in-flight" data of the user system 102 or the interaction servers 102. A content 400 is shown to include the following example components:

Content identifier 402: a unique identifier that identifies the content 400.

Content text payload 404: text, to be generated by a user via a user interface of the user system 102, and that is included in the content 400.

Content image payload 406: image data, captured by a camera component of a user system 102 or retrieved from a memory component of a user system 102, and that is included in the content 400. Image data for a sent or received content 400 may be stored in the image table 316.

Content video payload 408: video data, captured by a camera component or retrieved from a memory component of the user system 102, and that is included in the content 400. Video data for a sent or received content 400 may be stored in the image table 316.

Content audio payload 410: audio data, captured by a microphone or retrieved from a memory component of the user system 102, and that is included in the content 400.

Content augmentation data 412: augmentation data (e.g., filters, stickers, or other annotations or enhancements) that represents augmentations to be applied to content image payload 406, content video payload 408, or content audio payload 410 of the content 400. Augmentation data for a sent or received content 400 may be stored in the augmentation table 310.

Content duration parameter 414: parameter value indicating, in seconds, the amount of time for which content of the message (e.g., the content image payload 406, content video payload 408, content audio payload 410) is to be presented or made accessible to a user via the interaction client 102.

Content geolocation parameter 416: geolocation data (e.g., latitudinal and longitudinal coordinates) associated with the content payload of the message. Multiple content geolocation parameter 416 values may be included in the payload, each of these parameter values being associated with respect to content items included in the content (e.g., a specific image within the content image payload 406, or a specific video in the content video payload 408).

Content story identifier 418: identifier values identifying one or more content collections (e.g., "stories" identified in the story table 312) with which a particular content in the content image payload 406 of the content 400 is associated. For example, multiple images within the content image payload 406 may each be associated with multiple content collections using identifier values.

Content tag 420: each content 400 may be tagged with multiple tags, each of which is indicative of the subject matter of content included in the message payload. For example, where a particular image included in the content image payload 406 depicts an animal (e.g., a lion), a tag value may be included within the content tag 420 that is indicative of the relevant animal. Tag values may be generated manually, based on user input, or may be automatically generated using, for example, image recognition.

Content sender identifier 422: an identifier (e.g., a messaging system identifier, email address, or device identifier) indicative of a user of the user system 102 on which the content 400 was generated and from which the content 400 was sent.

Content receiver identifier 424: an identifier (e.g., a messaging system identifier, email address, or device identifier) indicative of a user of the user system 102 to which the content 400 is addressed.

Advertisement identifier 426: an identifier related to one or more advertisements that correspond to the content 400. For example, the advertisement identifier 426 may indicate one or more advertisements that may be provided in conjunction with the content 400.

The data (e.g., values) of the various components of content 400 may correspond to pointers to locations in tables within which the data is stored. For example, an image value in the content image payload 406 may be a pointer to (or address of) a location within an image table 316. Similarly, values within the content video payload 408 may point to data stored within a video table 314, values stored within the content augmentations 412 may point to data stored in an augmentation table 310, values stored within the content story identifier 418 may point to data stored in a story table 312, and values stored within the content sender identifier 422 and the content recipient identifier 424 may point to user records stored within an entity table 304. Further, the advertisement identifier 426 may be analyzed with respect to identifiers included in the advertisement table 320 to determine one or more advertisements that may be provided to a user of the interaction application 104 in conjunction with the user accessing the content 400.

Figure 5:
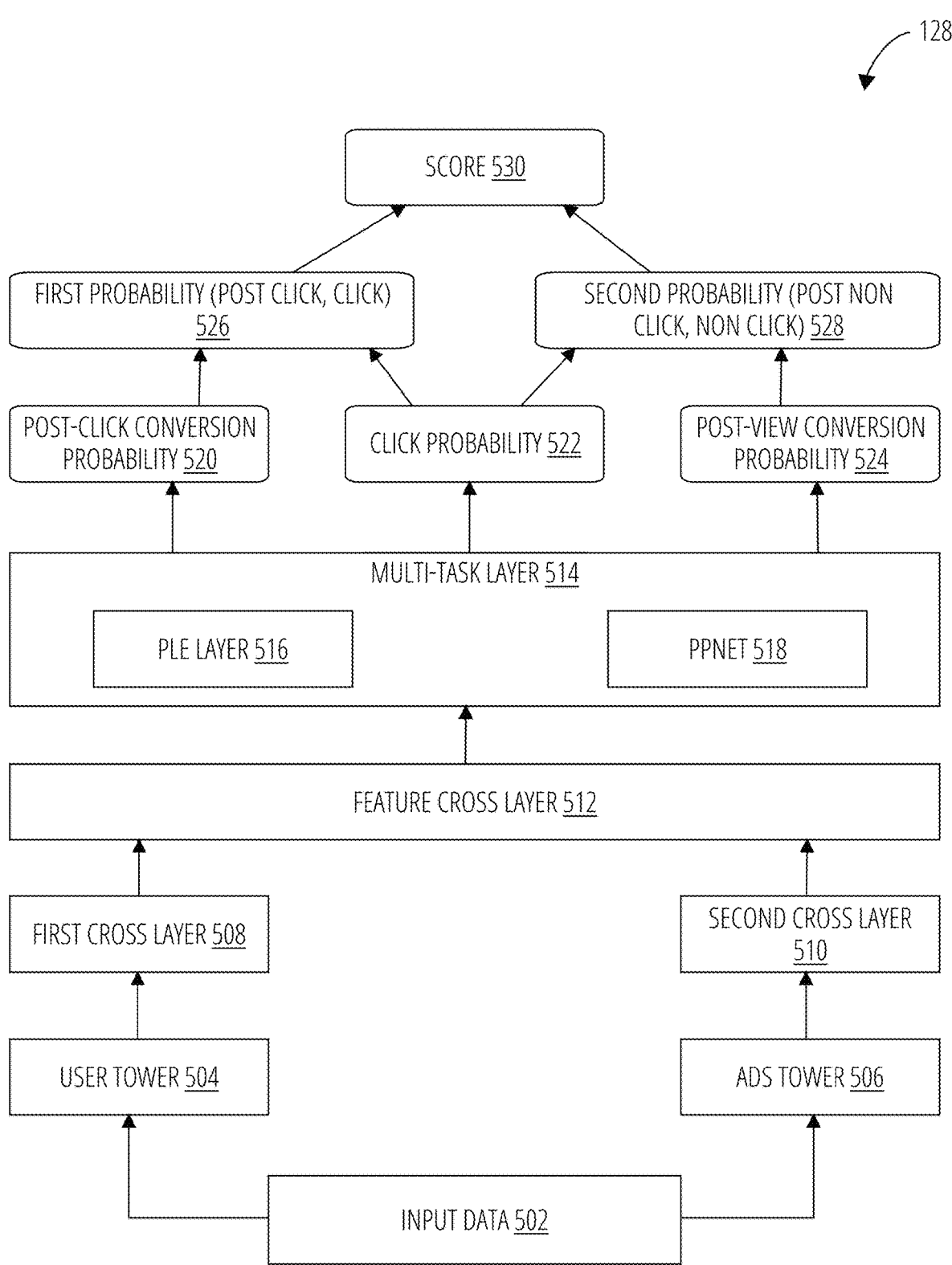
FIG. 5 is a schematic diagram illustrating a user action prediction system, according to some examples.

FIG. 5 is a schematic diagram illustrating a user action prediction system, according to some examples.

The input data 502 may include user data and advertisement data. The user data may be associated with user-related features. The advertisement data may be associated with advertisement-related features. The input data 502 comprises a rich set of data that captures various aspects of both users and advertisements. The user data may include any information regarding the users that may be accessed by the client device(s) 102, the server system 108, or other components of the interaction system 100. In some examples, user-related features include demographic information (e.g., age, gender), behavioral data (e.g., browsing history, past interactions with ads), and contextual information (e.g., device type, time of day). The advertisement data may include any information regarding the advertisements that may be accessed by the client device(s) 102, the server system 108, or other components of the interaction system 100. In some examples, advertisement-related features include a format of the advertisement (e.g., text, images, video), targeting parameters (e.g., information related to the targeted audience), placement information (e.g., channel, platform, frequency), position information (e.g., location within a user interface), engagement features (e.g., keyword, content), or historical performance metrics (e.g., conversion rate, viewability rate).

In some examples, the user data is fed into a user tower 504 to generate a user embedding representation, and the advertisement data is fed into an advertisement (ads) tower 506 to generate an advertisement embedding representation.

In some examples, the user tower 504 generates, using a first series of neural network layers, a user embedding representation for the user data. In some examples, the user embedding representation for the user data captures various user-related features. In some examples, the user embedding representation has 1024 dimensions.

In some examples, the ads tower 506 generates, using a second series of neural network layers, an advertisement embedding representation for the advertisement data. In some examples, the advertisement embedding representation for the advertisement data captures various advertisement-related features or characteristics of the advertisement. In some examples, the advertisement embedding representation has the same dimension as that of the user embedding representation. For example, both the user embedding representation and the advertisement embedding representation have a dimension of 1024.

The first cross layer 508 may include a first cross network and a first deep network. The first cross network may be configured to process the user embedding representation received from the user tower 504. In some examples, the user embedding representation is fed into the first cross layer 508. The user embedding representation may go through the first cross network configured to capture explicit feature interactions. In some examples, the user embedding representation enters the first deep network that includes a first plurality of fully connected layers to learn implicit feature interactions. For example, the first deep network comprises three first plurality of fully connected layers. The outputs from both the first cross network and first deep network may be combined to generate a user cross-feature representation. In some examples, the outputs from both the first cross network and the first deep network are combined in a stacked structure. In other examples, the outputs from the first cross network and the first deep network are combined in a parallel structure. The user cross-feature representation may capture intricate, hidden, or implicit relationships within the user data.

In some examples, layer normalization is performed within the first cross network or the first deep network. In some examples, layer normalization is performed within each fully connected layer of the first plurality of fully connected layers. The layer normalization is a row-wise normalization, and the first cross network comprises element-wise layers, therefore, the layer normalization presents a technical advantage of reducing the impacts of outlier features or big feature values.

The second cross layer 510 includes a second cross network and a second deep network. The second cross network may be configured to process the advertisement embedding representation received from the ads tower 506. In some examples, the advertisement embedding representation is fed into the second cross layer 510. The advertisement embedding representation may go through the second cross network configured to capture explicit feature interactions. In some examples, the advertisement embedding representation enters the second deep network that includes a second plurality of fully connected layers to learn implicit feature interactions. For example, the second deep network comprises five plurality of fully connected layers. The outputs from both the second cross network and the second deep network may be combined to generate an advertisement cross-feature representation. In some examples, the outputs from both the second cross network and the second deep network are combined in a stacked structure. In other examples, the outputs from the second cross network and the second deep network are combined in a parallel structure. The advertisement cross-feature representation may capture intricate, hidden, or implicit relationships within the advertisement data.

In some examples, layer normalization is performed within the second cross network and the second deep network. In some examples, layer normalization is performed within each fully connected layer of the second plurality of fully connected layers. The layer normalization is a row-wise normalization, and the second cross network comprises element-wise layers, therefore, the layer normalization presents a technical advantage of reducing the impacts of outlier features or big feature values.

The feature cross layer 512 may combine a user cross-feature representation and an advertisement cross-feature representation received, respectively, from the first cross layer 508 and the second cross layer 510. In some examples, the output from the feature cross layer 512 is a feature cross representation. A dimension of the feature cross representation may be $2^N$, where N is a positive integer. For example, a dimension of the feature cross representation is 1024 (i.e., $2^{10}$). The feature cross representation may be fed into the multi-task layer 514 for processing.

The multi-task layer 514 is configured to process the feature cross representation and predict a probability associated with a user action. For example, the user action may include a post-click conversion, a post-view conversion, or a click. In some examples, a click refers to a user interaction. For example, the number of clicks refers to the number of user interactions with the advertisement. User interactions may include swiping, clicking, selecting, touching, or performing other gesture(s).

In some examples, the multi-task layer 514 comprises a progressive layered extraction (PLE) layer. The PLE layer 516 enhances an ability to learn both shared and task-specific features. In some examples, the PLE layer 516 organizes the learning process in a hierarchical manner, progressively extracting and refining features relevant to each task while maintaining a balance between shared knowledge and task-specific knowledge.

In some examples, the PLE layer 516 comprises a shared expert network and one or more task-specific expert networks. The one or more task-specific expert networks learn common features that are useful across all tasks, while the one or more task-specific expert networks focus on extracting features that are relevant to their respective tasks. In some examples, their respective tasks include predicting a click probability (e.g., click probability 522) of the user clicking on an advertisement, a post-click page-view probability, a post-click sign-up probability, a post-click add-to-cart probability, and a post-click purchase probability. In some examples, their respective tasks include a post-view page-view probability, a post-view sign-up probability, a post-view add-to-cart probability, and a post-view purchase probability. In some examples, the PLE layer 516 comprises nine task-specific expert networks, each of which is configured to predict the probabilities mentioned above.

In some examples, as an output from previous neural network layers (e.g., feature cross representation) flow through the PLE layer 516, the output undergoes a gradual refinement process. For example, as the information progresses through the one or more task-specific expert networks, the features become increasingly specialized and task-specific. This progressive specialization allows the user action prediction system 128 to capture both the commonalities and the unique aspects of different tasks.

The PLE layer 516 presents a technical advantage in addressing the challenge of negative transfer in multi-task learning. By explicitly modeling both shared and task-specific knowledge, the PLE layer 516 prevents seesaw phenomena, which are situations in which learning for one task interferes with or degrades performance on another task.

The multi-task layer 514 may include a parameter personalized network (PPNet). The PPNet 518 may enhance the ability to provide multiple predictions by modifying parameters through a gating network 704.

In some examples, the PPNet 518 allows for a degree of parameter customization, enabling the user action prediction system 128 to capture nuances more accurately. The parameter customization may be accomplished by concatenating personalized data about the user and advertisement with the input of each task-specific expert network (e.g., 706).

In some examples, the PPNet 518 works in conjunction with the PLE layer 516 to predict the probabilities associated with different user actions, such as purchase, sign-up, page-view, and add-to-cart actions. For each of these tasks (e.g., predicting different probabilities associated with the different user actions), the inclusion of the PPNet 518 helps improve the performance on these tasks. More detailed description of the PPNet 518 will be discussed with reference to FIG. 7.

In some examples, outputs of the multi-task layer 514 comprise post-click conversion probability 520, a click probability 522, and a post-view conversion probability 524.

The post-click conversion probability 520 may be a probability value indicating the probability of a post-click conversion. A post-click conversion may be an action taken by the user after the user clicks on an advertisement, such as page-view, sign-up, add-to-cart, and purchase. In some examples, after clicking on an advertisement, the user may view the landing page or product page. This action may be referred to as a page-view. When the user proceeds to create an account or subscribe to a service, this user action may be referred to as a sign-up. Adding a product to the shopping cart demonstrates strong purchase intent and may be referred to as add-to-cart. Purchase may occur when the user completes a transaction. The post-click conversion probability 520 comprises the predicted probability of the post-click conversion. In some examples, the post-click conversion probability 520 is predicted by the multi-task layer 514. In some examples, multiple post click probabilities are calculated with respect to each type of conversation. For example, the multi-task layer 514 predicts a probability associated with each post-click conversion of the four types of post-click conversions, including page-view, sign-up, add-to-cart, and purchase.

The click probability 522 may be a value indicating the predicted probability of an interaction with the advertisement by the user, such as the user clicking on the advertisement.

The post-view conversion probability 524 may be a probability value indicating the probability of a view conversion. A post-view conversion may be an action taken by the user after he or she views but not interact with an advertisement. In some examples, there are four types of post-view conversion, which include page-view, sign-up, add-to-cart, and purchase. In some examples, after viewing an advertisement, the user may perform a page-view, sign-up, add-to-cart, and/or purchase. The post-view conversion probability 524 may comprise the predicted probability of a type of post-view conversion. In some examples, the post-view conversion probability 524 is predicted by the multi-task layer 514. In some examples, multiple post-view conversion probabilities 524 are calculated with respect to each type of conversion. For example, the multi-task layer 514 predicts a probability associated with each post-view conversion of the four types of post-view conversions, including page-view, sign-up, add-to-cart, and purchase. In some examples, when a user both views and interacts with an advertisement before making a conversion (e.g., sign-up, purchase), the conversion is counted as a post-click conversion rather than a post-view conversion.

A first probability (post click, click) 526 may be calculated based on the post-click conversion probability 520 and click probability 522. The first probability (post click, click) 526 may be referred to as the click-through conversion (CTC) probability, which may be calculated as the product of the post-click conversion probability 520 and the click probability 522. For example, if the probability of the post-click conversion probability 520 is 10%, and the click probability 522 is 50%, the first probability (post click, click) 526 is 5%.

A second probability (post non click, non click) 528 may be calculated based on the click probability 522 and the post-view conversion probability 524. The second probability (post non click, non click) 528 may be referred to as the view-through conversion (VTC) probability, which may be calculated as the product of the non-click probability (i.e., 1-click probability 522) and the post-view conversion probability 524. For example, if the click probability 522 is 50% and the post-view conversion probability 524 is 2%, then the second probability (post non click, non click) 528 is 1%.

In some example, the user action prediction system 128 calculates a score 530 based on the first probability (post click, click) 526 and the second probability (post non click, non click) 528. For example, the score 530 is calculated as a sum of the first probability (post click, click) 526 and the second probability (post non click, non click) 528.

In some examples, a CTC loss function is calculated based on individual loss functions associated with the one or more user actions. The CTC loss function combines weighted losses for user interaction (e.g., click), page-view, sign-up, add-to-cart, and purchase actions. In some examples, the CTC loss function is defined as follows:

$$CTC \text{ Loss} = \text{weight } 1 \times \text{loss (user interaction)} +$$

$$\text{weight } 2 \times \text{loss (page-view, user interaction)} +$$

$$\text{weight } 3 \times \text{loss (sign-up, user interaction)} +$$

$$\text{weight } 4 \times \text{loss (add-to-cart, user interaction)} +$$

$$\text{weight } 5 \times \text{loss (purchase, user interaction)}.$$

In the above CTC Loss function, weight 1 through weight 5 are parameters that balance the importance of each task. The loss (user interaction) represents the cross-entropy loss between the predicted click probability and the actual click probability, calculated using real-world input data. The subsequent loss terms (e.g., loss (page-view, user interaction)) represent the cross-entropy losses for predicting specific user actions given that a click has occurred.

In some examples, a VTC loss function is determined based on loss functions associated with the one or more user actions in the absence of the user interaction. The VTC loss function is defined as:

$$VTC \text{ Loss} = \text{weight } 6 \times \text{loss (view)} + \text{weight } 7 \times \text{loss (page-view, view)} +$$

$$\text{weight } 8 \times \text{loss (sign - up, view)} + \text{weight } 9 \times \text{loss (add-to-cart, view)} +$$

$$\text{weight } 10 \times \text{loss (purchase, view)}.$$

In the VTC loss function, weight 6 through weight 10 are parameters balancing the importance of each task. The loss (view) is calculated from the loss (user interaction), as the probability of a user not interacting with the advertisement can be determined based on the click probability (e.g., view probability=1-click probability). The subsequent loss terms (e.g., loss (page-view, view)) represent the cross-entropy losses for predicting specific user actions given that a view (non-click) has occurred.

These loss functions allow the user action prediction system 128 to simultaneously optimize (e.g., fine-tune, improve, train) for different conversion types. The weights of the CTC loss function and the VTC loss function may be adjusted during the training process to achieve the desired objective by allowing the user action prediction system 128 to prioritize and optimize for that specific task. For example, by increasing the weight associated with the purchase task (e.g., weight5 in CTC Loss and weight 10 in VTC Loss), the user action prediction system 128 places more importance on accurately predicting purchase events.

During backpropagation, the increased weight for the purchase task results in larger gradients for the parameters related to purchase prediction. This leads to more significant updates to these parameters, improving the an ability to predict purchases. The weights help balance the learning across different tasks. By increasing the weight for purchases, the user action prediction system 128 may allocate more capacity to learning features and patterns relevant to purchase prediction, potentially at the expense of other tasks.

In some examples, purchase events are typically rarer than other events like clicks or page views. Increasing the weight for purchases can help counteract this imbalance, preventing the user action prediction system 128 from overlooking the importance of this less frequent but high-value event. The weights can be dynamically adjusted based on user behavior or business objectives. For users more likely to make purchases, the purchase weight can be increased to further optimize for this outcome.

By tuning these weights, the user action prediction system 128 may be steered towards better performance on the purchase task while still maintaining reasonable performance on other tasks, ultimately helping to boost purchase rates in the recommendation system. Weights corresponding to other tasks may also be adjusted, allowing for a flexible and targeted optimization strategy that can adapt to changing business goals and user behaviors.

A content having a greatest probability of one or more of the content actions may be determined and the content may be made accessible to the user via the interaction application. In this way, users of the interaction application may be provided with content items that are of interest to the users.

Figure 6:
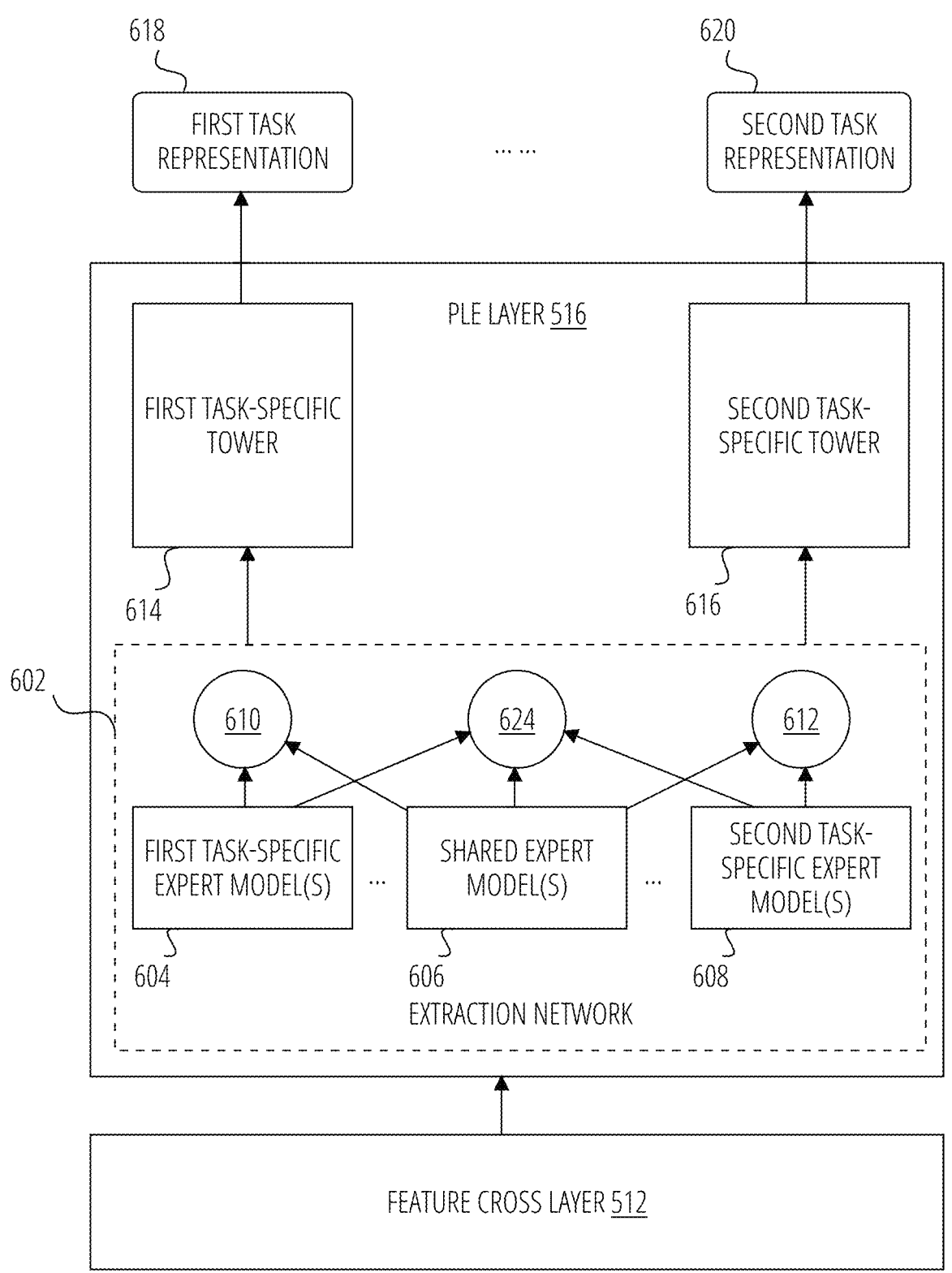
FIG. 6 is a schematic diagram illustrating further details regarding the user action prediction system, according to some examples.

FIG. 6 is a schematic diagram illustrating further details of the user action prediction system, according to some examples.

One or more outputs of the PLE layer 516 may correspond to one or more tasks, such as predicting click probability 522, post-click conversion probability 520, and post-view conversion probability 524. The one or more outputs of the PLE layer 516 may include first task representation 618, second task representation 620, etc. In some examples, the first task representation 618 corresponds to a post-click sign-up probability, the second task representation 620 corresponds to a post-click purchase probability. In some examples, the PLE layer 516 generates nine outputs corresponding to four types of post-click conversion, four types of post-view conversion, and click probability.

The PLE layer 516 may include an extraction network 602 and a task specific tower. For example, the PLE layer 516 includes an extraction network 602 and a first task-specific tower 614. The extraction network 602 may comprise a gate (e.g., first gate 610), a group of task-specific expert models (e.g., a group of first task-specific expert models 604), and a group of shared expert models (e.g., a group of shared expert models 606). In some examples, the extraction network 602 is configured to perform two tasks and comprises two groups of task-specific expert models (e.g., first task-specific expert models and second task-specific expert models). In the examples in which the extraction network 602 is configured to generate nine outputs, the extraction network 602 comprises nine groups of task-specific expert models.

In some examples, the extraction network 602 processes a feature cross representation received from a feature cross layer 512 using various groups of task-specific expert models and/or shared expert models to generate one or more processed feature cross representations. These processed feature cross representation may be fed into additional groups of task-specific expert models and/or shared expert models within the extraction network 602. For example, the extraction network 602 comprises a group of task-specific expert models, a group of shared expert models, and a plurality of gates. A feature cross representation is processed by the group of task-specific expert models and the group of shared expert models. The plurality of gates may distribute the feature cross representation or the one or more processed feature cross representations to different expert models. The gates may combine or concatenate the one or more processed feature cross representations. For example, the one or more processed feature cross representations are combined into a first processed feature cross representation with a dimension that is the same with those of the other processed feature cross representations.

In a more specific example, the extraction network 602 comprises a group of first task-specific expert models 604, a group of shared expert models 606, and a group of second task-specific expert models 608. The group of first task-specific expert models 604 corresponds to a task of calculating a post-click conversion probability 520 (e.g., post-click page-view probability 724). The group of second task-specific expert models 608 corresponds to the task of calculating a post-view conversion probability 524 (e.g., post-view sign-up probability 734). The group of first task-specific expert models 604, the group of second task-specific expert models 608, and the group of shared expert model 606 may each process the feature cross representation received by the extraction network 602 from the feature cross layer 512. Processing of the feature cross representation may include using each task-specific expert model within the group of task-specific expert models to transform the feature cross representation or processed feature cross representation. A plurality of gates may direct the feature cross representation or the processed feature cross representations within the extraction network 602. In other words, a gate may control the input or output of the each task-specific expert model.

The extraction network 602 may output a processed feature cross representation (e.g., a first processed feature cross representation) into a task-specific tower, such as the first task-specific tower 614. For example, a group of first task-specific expert models 604 processes a feature cross representation and generates a first processed feature cross representation, and a group of shared expert models 606 processes a feature cross representation to generate a second processed feature cross representation. The first gate 610 combines the first processed feature cross representation and second processed feature cross representation to generate a combined processed feature cross representation. The first gate 610 inputs the combined processed feature cross representation into the first task-specific tower 614.

A task-specific tower of the PLE layer 516, such as the first task-specific tower 614 and the second task-specific tower 616, may be multi-layer network configured to generate a task representation corresponding to the task. For example, the first task-specific tower 614 is a multi-layer network configured to generate a first task representation 618, and the second task-specific tower 616 is another multi-layer network configured to generate a second task representation 620.

Figure 7:
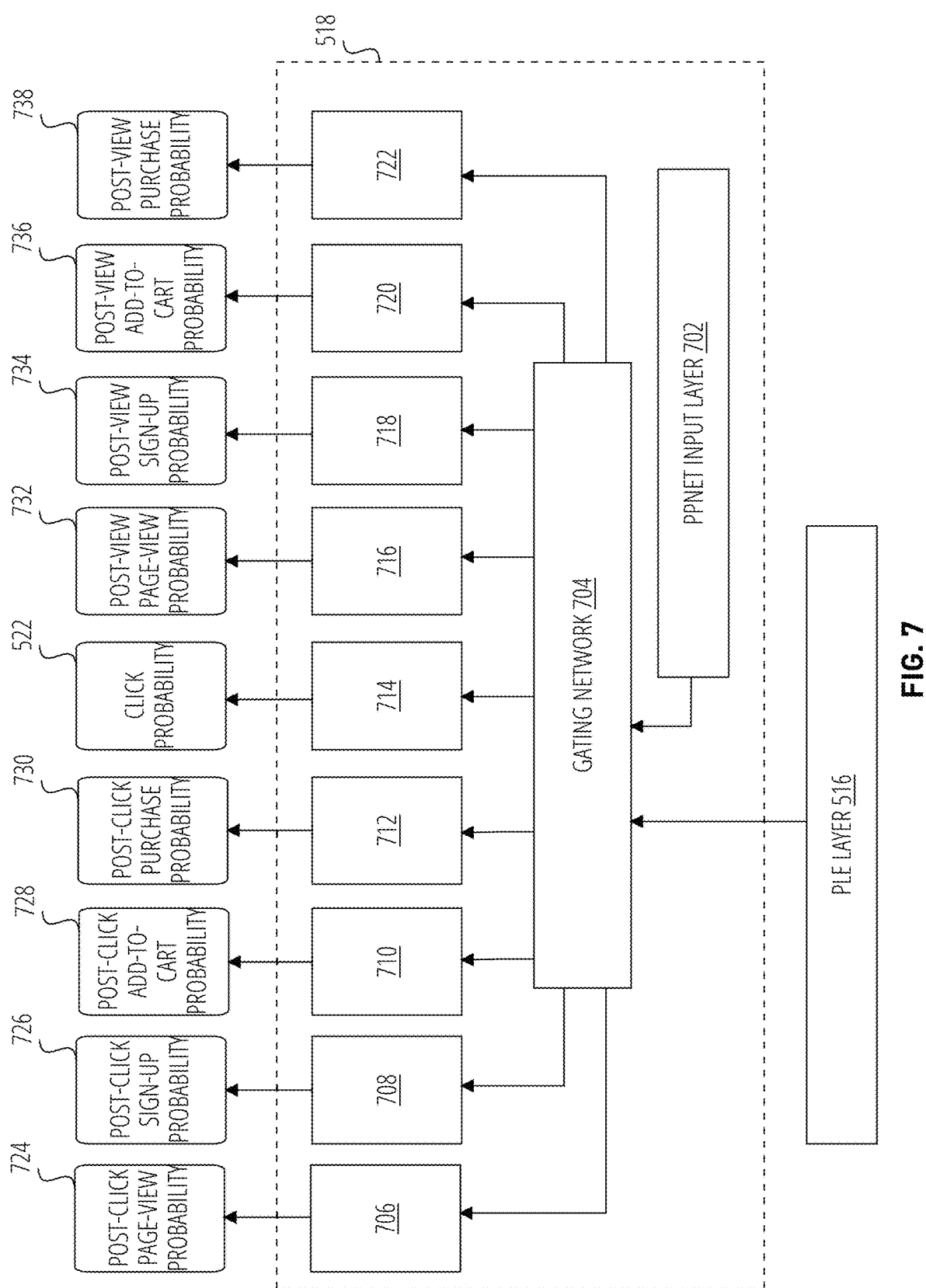
FIG. 7 is a schematic diagram illustrating further details regarding the user action prediction system, according to some examples.

FIG. 7 is a schematic diagram illustrating further details of the user action prediction system, according to some examples.

The multi-task layer 514 may comprise a PPNet 518. The PPNet 518 may includes a PPNET input layer 702, a gating network 704, one or more task-specific expert networks (e.g., 706, 708, . . . , 722). The PPNet 518 may receives a task representation from the PLE layer 516, such as the first task representation 618. In some examples, the task representation is fed into the gating network 704. In some other examples, the task representation is fed into one or more task-specific expert networks (e.g., 706-722). The gating network 704 may receive a PPNET input from the PPNET input layer 702. In some examples, the gating network 704 is configured to combine the task representation with the PPNET input. In other words, the gating network 704 is configured to control the information flow among task-specific expert networks.

The PPNET input layer 702 be configured to generate a PPNET input based on personalized data. The PPNET input may be a representation of the personalized data. The personalized data may include data corresponding to dense features, discrete features, or sparse id list features. In some examples, the personalized data have some overlaps with the input data 502, but the input data 502 includes a larger amount of data.

In some examples, data corresponding to a dense feature comprises a numeric value. For example, a dense feature of an advertisement includes a number of views and a number of clicks in the last seven days. In some examples, data corresponding to a discrete feature comprises a single-valued categorical variable, which may be represented using an embedding lookup layer for interpretation and analysis. For example, the discrete feature of the advertisement includes advertisement_ID, request city ID, etc. In some examples, data corresponding to a sparse id list feature comprises a multi-hot encoded categorical feature. For example, the sparse id list feature of the advertisement includes last 100 view pixel ID.

In some examples, the subset of the input data 502 includes data corresponding to the following user-related features:

1. Geographical Information:
"request___country": The country from which a request is originated
"Request___city": The city from which a request is originated
"request___region": The geographical region of the request
"request___geo_metro": The metropolitan area of the request
1. Device and Platform Information:
"request___platform_type": The platform or operating system of the device
"request___device_model": The specific model of the device
"user_profile___device_make": The manufacturer of the device
"request___app_version": The version of the app making a request
1. User Demographics and Preferences:
"user_profile___gender": The gender of the user
"request___language": The language setting of a device or a browser
1. Connection and Source Information:
"request___connectivity_type": The type of internet connection used by a device
"request___publisher": The publisher or app where the a request is originated
"request___last_vs_view_source": The source of a last video view In some examples, the subset of the input data 502 includes data corresponding to the following advertisement-related features:

1. Advertisement Identifiers:
"li___ad_account_id_plain": Unique identifier for an account of an advertiser
"li___campaign_id_plain": Unique identifier for the advertisement campaign
"li___line_item_id_plain": Unique identifier for the specific line item in the advertisement campaign
"ad___ad_id_plain": Unique identifier for the specific advertisement
1. Advertisement Information:
"li___brand_id_plain": Unique identifier for the brand associated with the advertisement
"li___industry": The industry category of the advertiser
"ad___ad_type": The type or format of the advertisement
"ad___app_id_plain": Unique identifier for the app on which the advertisement is presented
1. Tracking Information:
"li___pixel_id_plain": Identifier for tracking pixel associated with the advertisement As described above, the PPNET input generated by the PPNET input layer 702 may comprise a representation of the personalized data. The representation of the personalized data may help the PPNet 518 put more emphasis on dense features, discrete features, and sparse id list features in subsequent processes.

Blocks 706-722 shown in FIG. 7 represent one or more task-specific expert networks within the PPNet 518. The one or more specific task-specific expert networks may be configured to perform different tasks. For example, the one or more task-specific expert networks are configured to calculate (e.g., predict) different conversion probabilities, such as post-click conversion probability 520 or post-view conversion probabilities 524. The post-click conversion probability 520 may be a post-click page-view probability 724, a post-click sign-up probability 726, a post-click add-to-cart probability 728, a post-click purchase probability 730, or any other probability metrics related to post-click conversion. The post-view conversion probability 524 may be a post-view page-view probability 732, a post-view sign-up probability 734, a post-view add-to-cart probability 736, post-view purchase probability 738, or any other probability metric related to post-view conversion.

For the example shown in FIG. 7, task-specific expert network 706 is configured to calculate a post-click page-view probability 724; task-specific expert network 708 is configured to calculate a post-click sign-up probability 726; task-specific expert network 710 is configured to calculate a of post-click add-to-cart probability 728; task-specific expert network 712 is configured to calculate a post-click purchase probability 730; task-specific expert network 714 is configured to calculate a click probability 522; task-specific expert network 716 is configured to calculate a post-view page-view probability 732; task-specific expert network 718 is configured to calculate a post-view sign-up probability 734; task-specific expert network 720 is configured to calculate a post-view add-to-cart probability 736; and task-specific expert network 722 is configured to calculate a post-view purchase probability 738. The one or more task-specific expert networks may generate a probability value (e.g., post-click page-view probability 724, post-click sign-up probability 726, etc.) by converting an output of a task-specific expert network to a value between 0 and 1. For example, the one or more task-specific expert model uses a Sigmoid or a SoftMax function to perform the conversion.

In some examples, each task-specific expert network of the one or more task-specific expert networks comprises a plurality of layers. A PPNET input may be combined with inputs or outputs of the plurality of layers. For example, an input of a task-specific expert network 706 comprises a task-specific representation (e.g., first task representation 618, second task representation 620). The task-specific representation may be combined with the PPNET input before entering a first layer of a plurality of layers of a task-specific expert network. For example, the output of a first layer of the task-specific expert network 706 may be combined with the PPNET input before being inputted into a second layer of the task-specific expert network 706. In some examples, the combining of the inputs or outputs of the plurality of layers with a PPNET input is performed by the gating network 704. A technical advantage is presented by combining the inputs or outputs of the plurality of layers with a PPNET input: an outcome of the PPNet 518 may put more emphasis on the features associated with the personalized data. A task-specific representation may have lost some information after being processed by the first DCN v2 or the PLE layer 516. For example, some subtle feature interactions may have become less prominent. The PPNET input may cause the multi-task layer 514 to reemphasize some of these nuanced relationships among features, improving task performance, such as producing more accurate predictions on conversion metrics.

Figure 8:
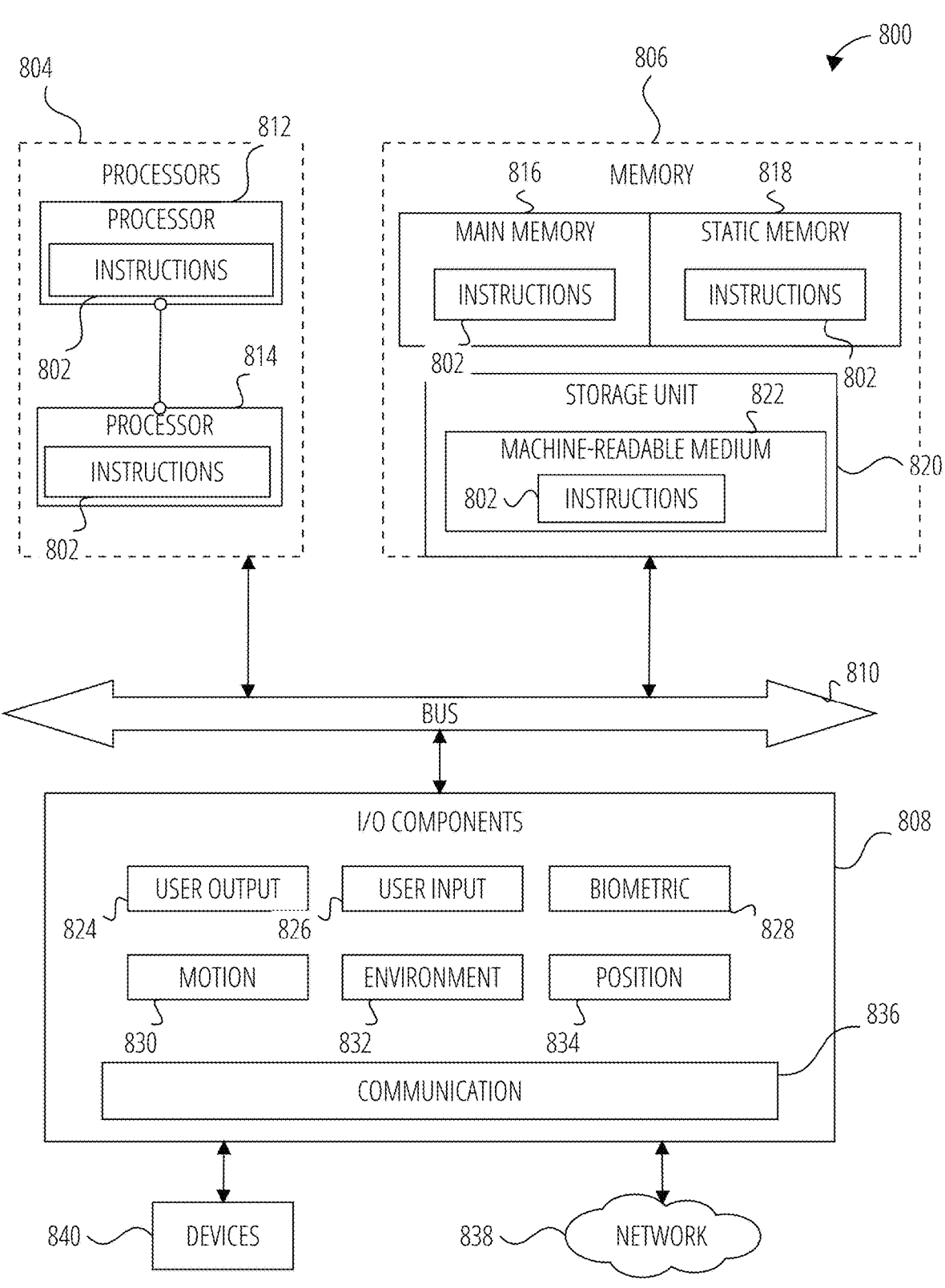
FIG. 8 is a diagrammatic representation of a machine in the form of a computer system within which a set of instructions may be executed to cause the machine to perform any one or more of the methodologies discussed herein, according to some examples.

FIG. 8 is a diagrammatic representation of the machine 800 within which instructions 802 (e.g., software, a program, an application, an applet, an app, or other executable code) for causing the machine 800 to perform any one or more of the methodologies discussed herein may be executed. For example, the instructions 802 may cause the machine 800 to execute any one or more of the methods described herein. The instructions 802 transform the general, non-programmed machine 800 into a particular machine 800 programmed to carry out the described and illustrated functions in the manner described. The machine 800 may operate as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 802, sequentially or otherwise, that specify actions to be taken by the machine 800. Further, while a single machine 800 is illustrated, the term "machine" shall also be taken to include a collection of machines that individually or jointly execute the instructions 802 to perform any one or more of the methodologies discussed herein. The machine 800, for example, may comprise the client device(s) 102 or any one of multiple server devices forming part of the client device(s) 102. In some examples, the machine 800 may also comprise both client and server systems, with certain operations of a particular method or algorithm being performed on the server-side and with certain operations of the particular method or algorithm being performed on the client-side.

The machine 800 may include processors 804, memory 806, and input/output I/O components 808, which may be configured to communicate with each other via a bus 810. In an example, the processors 804 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 812 and a processor 814 that execute the instructions 802. The term "processor" is intended to include multi-core processors that may comprise two or more independent processors (sometimes referred to as "cores") that may execute instructions contemporaneously. Although FIG. 8 shows multiple processors 804, the machine 800 may include a single processor with a single-core, a single processor with multiple cores (e.g., a multi-core processor), multiple processors with a single core, multiple processors with multiples cores, or any combination thereof.

The memory 806 includes a main memory 816, a static memory 818, and a storage unit 820, both accessible to the processors 804 via the bus 810. The main memory 806, the static memory 818, and storage unit 820 store the instructions 802 embodying any one or more of the methodologies or functions described herein. The instructions 802 may also reside, completely or partially, within the main memory 816, within the static memory 818, within machine-readable medium 822 within the storage unit 820, within at least one of the processors 804 (e.g., within the processor's cache memory), or any suitable combination thereof, during execution thereof by the machine 800. The memory 806, the main memory 816, the static memory 818, or the storage unit 820 may comprise a non-transitory computer-readable storage medium.

The I/O components 808 may include a wide variety of components to receive input, provide output, produce output, transmit information, exchange information, capture measurements, and so on. The specific I/O components 808 that are included in a particular machine will depend on the type of machine. For example, portable machines such as mobile phones may include a touch input device or other such input mechanisms, while a headless server machine will likely not include such a touch input device. It will be appreciated that the I/O components 808 may include many other components that are not shown in FIG. 8. In various examples, the I/O components 808 may include user output components 824 and user input components 826. The user output components 824 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 826 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 808 may include biometric components 828, motion components 830, environmental components 832, or position components 834, among a wide array of other components. For example, the biometric components 828 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies, including:
Electroencephalography (EEG) based BMIs, which record electrical activity in the brain using electrodes placed on the scalp.
Invasive BMIs, which used electrodes that are surgically implanted into the brain.
Optogenetics BMIs, which use light to control the activity of specific nerve cells in the brain.

Any biometric data collected by the biometric components is captured and stored only with user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

The motion components 830 include acceleration sensor components (e.g., accelerometer), gravitation sensor components, rotation sensor components (e.g., gyroscope).

The environmental components 832 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device(s) 102 may have a camera system comprising, for example, front cameras on a front surface of the client device(s) 102 and rear cameras on a rear surface of the client device(s) 102. The front cameras may, for example, be used to capture still images and video of a user of the client device(s) 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device(s) 102 may also include a 360° camera for capturing 360° photographs and videos.

Further, the camera system of the client device(s) 102 may include dual rear cameras (e.g., a primary camera as well as a depth-sensing camera), or even triple, quad or penta rear camera configurations on the front and rear sides of the client device(s) 102. These multiple cameras systems may include a wide camera, an ultra-wide camera, a telephoto camera, a macro camera, and a depth sensor, for example.

The position components 834 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 808 further include communication components 836 operable to couple the machine 800 to a network 838 or devices 840 via respective coupling or connections. For example, the communication components 836 may include a network interface component or another suitable device to interface with the network 838. In further examples, the communication components 836 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 840 may be another machine or any of a wide variety of peripheral devices (e.g., a peripheral device coupled via a USB).

Moreover, the communication components 836 may detect identifiers or include components operable to detect identifiers. For example, the communication components 836 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 836, such as location via Internet Protocol (IP) geolocation, location via Wi-Fi® signal triangulation, location via detecting an NFC beacon signal that may indicate a particular location, and so forth.

The various memories (e.g., main memory 816, static memory 818, and memory of the processors 804) and storage unit 820 may store one or more sets of instructions and data structures (e.g., software) embodying or used by any one or more of the methodologies or functions described herein. These instructions (e.g., the instructions 802), when executed by processors 804, cause various operations to implement the disclosed examples.

The instructions 802 may be transmitted or received over the network 838, using a transmission medium, via a network interface device (e.g., a network interface component included in the communication components 836) and using any one of several well-known transfer protocols (e.g., hypertext transfer protocol (HTTP)). Similarly, the instructions 802 may be transmitted or received using a transmission medium via a coupling (e.g., a peer-to-peer coupling) to the devices 840.

Figure 9:
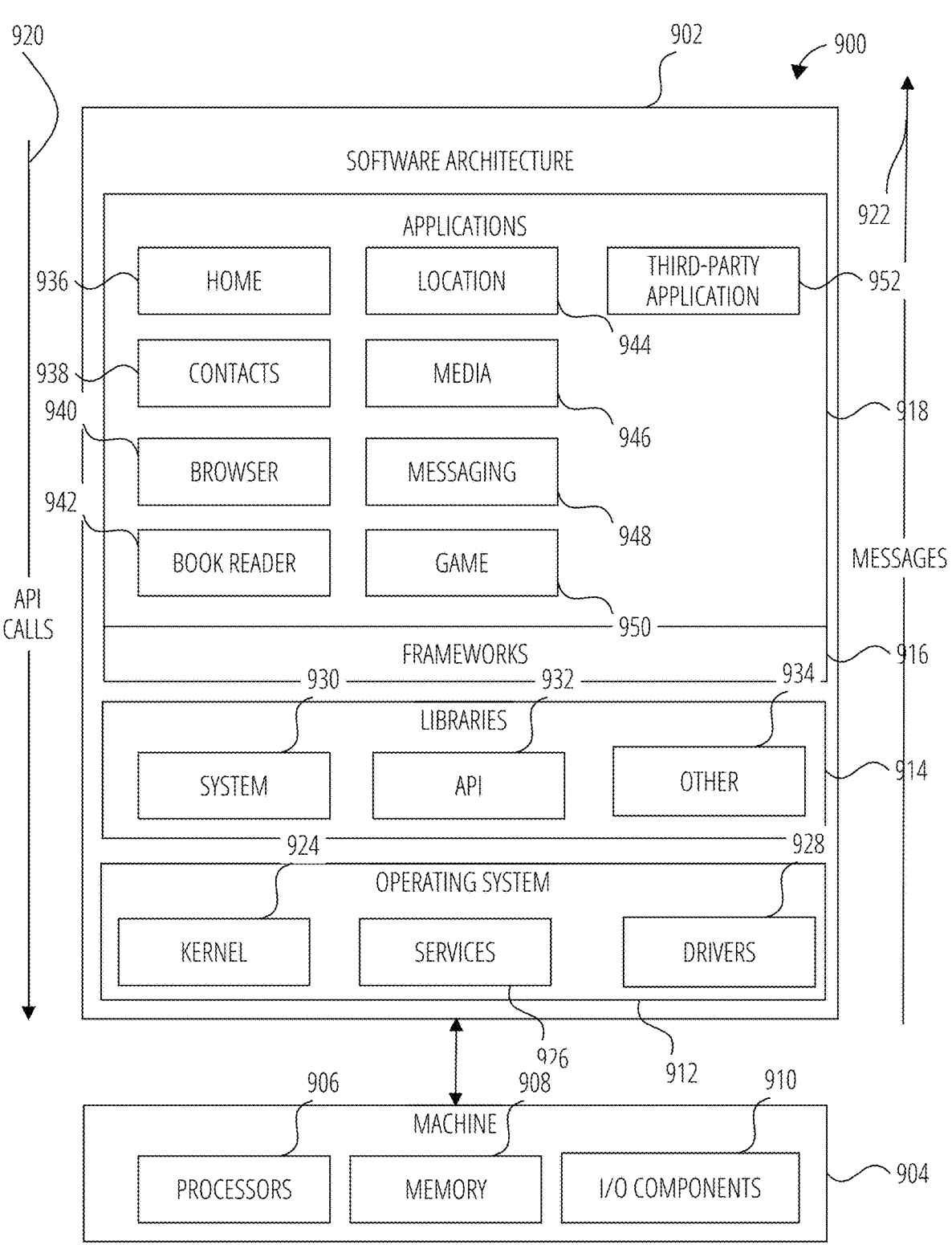
FIG. 9 is a block diagram showing a software architecture within which examples may be implemented, according to some examples.

FIG. 9 is a block diagram 900 illustrating a software architecture 902, which can be installed on any one or more of the devices described herein. The software architecture 902 is supported by hardware such as a machine 904 that includes processors 906, memory 908, and I/O components 910. In this example, the software architecture 902 can be conceptualized as a stack of layers, where each layer provides a particular functionality. The software architecture 902 includes layers such as an operating system 912, libraries 914, frameworks 916, and applications 918. Operationally, the applications 918 invoke API calls 920 through the software stack and receive messages 922 in response to the API calls 920.

The operating system 912 manages hardware resources and provides common services. The operating system 912 includes, for example, a kernel 924, services 926, and drivers 928. The kernel 924 acts as an abstraction layer between the hardware and the other software layers. For example, the kernel 924 provides memory management, processor management (e.g., scheduling), component management, networking, and security settings, among other functionalities. The services 926 can provide other common services for the other software layers. The drivers 928 are responsible for controlling or interfacing with the underlying hardware. For instance, the drivers 928 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 914 provide a common low-level infrastructure used by the applications 918. The libraries 914 can include system libraries 930 (e.g., C standard library) that provide functions such as memory allocation functions, string manipulation functions, mathematic functions, and the like. In addition, the libraries 914 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 914 can also include a wide variety of other libraries 934 to provide many other APIs to the applications 918.

The frameworks 916 provide a common high-level infrastructure that is used by the applications 918. For example, the frameworks 916 provide various graphical user interface (GUI) functions, high-level resource management, and high-level location services. The frameworks 916 can provide a broad spectrum of other APIs that can be used by the applications 918, some of which may be specific to a particular operating system or platform.

In an example, the applications 918 may include a home application 936, a contacts application 938, a browser application 940, a book reader application 942, a location application 944, a media application 946, a messaging application 948, a game application 950, and a broad assortment of other applications such as a third-party application 952. The applications 918 are programs that execute functions defined in the programs. Various programming languages can be employed to create one or more of the applications 918, structured in a variety of manners, such as object-oriented programming languages (e.g., Objective-C, Java, or C++) or procedural programming languages (e.g., C or assembly language). In a specific example, the third-party application 952 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 952 can invoke the API calls 920 provided by the operating system 912 to facilitate functionalities described herein.

EXAMPLES

Example 1 is a method, comprising: receiving input data associated with a plurality of input features, the plurality of input features comprising user-related features and advertisement-related features; calculating a user embedding representation based on the input data associated with the user-related features using a user tower, the user tower comprising a first series of neural network layers; calculating an advertisement embedding representation based on the input data associated with the advertisement-related features using an advertisement (ads) tower, the ads tower comprising a second series of neural network layers; generating a feature cross representation based on the user embedding representation and the advertisement embedding representation using a feature cross layer; inputting the feature cross representation into a multi-task layer that comprises a progressive layered extraction (PLE) component; calculating, using the multi-task layer, probabilities of one or more user actions, the one or more user actions comprises an user interaction with an advertisement and at least one of pageview, sign-up, add-to-cart, and purchase after the user interaction with the advertisement; calculating a click-through conversion (CTC) probability based on the probabilities of one or more user actions; and generating a score based on the CTC probability.

In Example 2, the subject matter of Example 1 includes, wherein the generating the feature cross representation comprises: calculating a user cross-feature representation based on the user embedding representation using a first cross layer, the first cross layer comprising a first cross network and a first deep network; calculating an advertisement cross-feature representation based on the advertisement embedding representation using a second cross layer, the second cross layer comprising a second cross network and a second deep network; and generating the feature cross representation based on the user cross-feature representations and the advertisement cross-feature representations using the feature cross layer.

In Example 3, the subject matter of Examples 1-2 includes, wherein the PLE component comprises at least two groups of task-specific expert models, the at least two groups of task-specific expert models comprising: a first group of task-specific expert models configured to calculate a first task representation corresponding to a probability of a user action after the user interaction with the advertisement; and a second group of task-specific expert models configured to calculate a second task representation corresponding to a probability of the user interaction with the advertisement.

In Example 4, the subject matter of Example 3 includes, wherein the multi-task layer further comprises a parameter personalized network (PPNET) and the method further comprises: generating a PPNET input based on personalized data, the personalized data comprising data corresponding to a dense feature, a discrete feature, and a sparse id list feature; generating a combined input by combining the PPNET input with the first task representation; and generate the probability of the user action by processing the combined input using a task-specific expert network.

In Example 5, the subject matter of Example 4 includes, wherein the combined input is a first combined input and further comprises: generating a second combined input by combining the PPNET input with the second task representation; and generating the probability of the user interaction with the advertisement.

In Example 6, the subject matter of Examples 1-5 includes, generating a CTC loss function that comprises one or more loss functions associated with the one or more user actions; adjusting one or more weights to the one or more loss functions; and repeatedly tuning the multi-task layer by minimizing the CTC loss function that comprises the one or more adjusted weights.

In Example 7, the subject matter of Examples 1-6 includes, wherein the one or more user actions further comprises at least one of page-view, sign-up, add-to-cart, or purchase after viewing the advertisement; calculating a view-through conversion (VTC) probability based on the probabilities of the one or more user actions; and wherein the score is generated based on the CTC probability and the VTC probability.

In Example 8, the subject matter of Example 7 includes, wherein the PLE component comprises at least three task-specific expert networks, the at least three task-specific expert networks comprising: a first task-specific expert network configured to calculate a probability of one of the one or more user actions after the user interaction with the advertisement; a second task-specific expert network configured to calculate a probability of the user interaction with the advertisement; and a third task-specific expert network configured to calculate a probability of one of the one or more user actions after the user viewing the advertisement.

In Example 9, the subject matter of Examples 7-8 includes, calculating a user cross-feature representation based on the user embedding representation using a first cross layer, the first cross layer comprising a first cross network and a first deep network; calculating an advertisement cross-feature representation based on the advertisement embedding representation using a second cross layer, the second cross layer comprising a second cross network and a second deep network; and performing layer normalization within the first deep network and the second deep network.

In Example 10, the subject matter of Examples 7-9 includes, generating a CTC loss function and a VTC loss function based on one or more loss functions associated with the one or more user actions; adjusting one or more weights to the one or more loss functions; and repeatedly tuning the multi-task layer by minimizing the CTC loss function and the VTC loss function in response to the adjusting the one or more weights.

Example 11 is at least one machine-readable medium including instructions that, when executed by processing circuitry, cause the processing circuitry to perform operations to implement of any of Examples 1-10.

Example 12 is an apparatus comprising means to implement of any of Examples 1-10.

Example 13 is a system to implement of any of Examples 1-10.

Example 14 is a method to implement of any of Examples 1-10.

What is claimed is:

1. A method, comprising:
receiving input data associated with a plurality of input features, the plurality of input features comprising user-related features and advertisement-related features;
calculating a user embedding representation based on the input data associated with the user-related features using a user tower, the user tower comprising a first series of neural network layers;
calculating an advertisement embedding representation based on the input data associated with the advertisement-related features using an advertisement (ads) tower, the ads tower comprising a second series of neural network layers;
generating a feature cross representation based on the user embedding representation and the advertisement embedding representation using a feature cross layer;
inputting the feature cross representation into a multi-task layer that comprises a progressive layered extraction (PLE) component;
calculating, using the multi-task layer, probabilities of one or more user actions, the one or more user actions comprising a user interaction with an advertisement and at least one of page-view, sign-up, add-to-cart, and purchase after the user interaction with the advertisement;
calculating a click-through conversion (CTC) probability based on the probabilities of one or more user actions;
ranking one or more content items based on the CTC probability; and
causing display of the one or more content items based on the ranking.

2. The method of claim 1, wherein the generating the feature cross representation comprises:
calculating a user cross-feature representation based on the user embedding representation using a first cross layer, the first cross layer comprising a first cross network and a first deep network;
calculating an advertisement cross-feature representation based on the advertisement embedding representation using a second cross layer, the second cross layer comprising a second cross network and a second deep network; and generating the feature cross representation based on the user cross-feature representations and the advertisement cross-feature representations using the feature cross layer.

3. The method of claim 1, wherein the PLE component comprises at least two groups of task-specific expert models, the at least two groups of task-specific expert models comprising:

a first group of task-specific expert models configured to calculate a first task representation corresponding to a probability of a user action after the user interaction with the advertisement; and a second group of task-specific expert models configured to calculate a second task representation corresponding to a probability of the user interaction with the advertisement.

4. The method of claim 3, wherein the multi-task layer further comprises a parameter personalized network (PP-NET) and the method further comprises:

generating a PPNET input based on personalized data, the personalized data comprising data corresponding to a dense feature, a discrete feature, and a sparse id list feature;

generating a combined input by combining the PPNET input with the first task representation; and generate the probability of the user action by processing the combined input using a task-specific expert network.

5. The method of claim 4, wherein the combined input is a first combined input and further comprises:

generating a second combined input by combining the PPNET input with the second task representation; and generating the probability of the user interaction with the advertisement.

6. The method of claim 1, further comprising:

generating a CTC loss function that comprises one or more loss functions associated with the one or more user actions;

adjusting one or more weights to the one or more loss functions; and repeatedly tuning the multi-task layer by minimizing the CTC loss function that comprises the one or more adjusted weights.

7. The method of claim 1, wherein the one or more user actions further comprises at least one of page-view, sign-up, add-to-cart, or purchase after viewing the advertisement;

calculating a view-through conversion (VTC) probability based on the probabilities of the one or more user actions; and wherein the score is generated based on the CTC probability and the VTC probability.

8. The method of claim 7, wherein the PLE component comprises at least three task-specific expert networks, the at least three task-specific expert networks comprising:

a first task-specific expert network configured to calculate a probability of one of the one or more user actions after the user interaction with the advertisement;

a second task-specific expert network configured to calculate a probability of the user interaction with the advertisement; and a third task-specific expert network configured to calculate a probability of one of the one or more user actions after the user viewing the advertisement.

9. The method of claim 7, further comprising:

calculating a user cross-feature representation based on the user embedding representation using a first cross layer, the first cross layer comprising a first cross network and a first deep network;

calculating an advertisement cross-feature representation based on the advertisement embedding representation using a second cross layer, the second cross layer comprising a second cross network and a second deep network; and performing layer normalization within the first deep network and the second deep network.

10. The method of claim 7, further comprising:

generating a CTC loss function and a VTC loss function based on one or more loss functions associated with the one or more user actions;

adjusting one or more weights to the one or more loss functions; and repeatedly tuning the multi-task layer by minimizing the CTC loss function and the VTC loss function in response to the adjusting the one or more weights.

11. A computing system, comprising:

at least one processor; and at least one memory storing instructions that, when executed by the at least processor, configure the computing system to:

receive input data associated with a plurality of input features, the plurality of input features comprising user-related features and advertisement-related features;

calculate a user embedding representation based on the input data associated with the user-related features using a user tower, the user tower comprising a first series of neural network layers;

calculate an advertisement embedding representation based on the input data associated with the advertisement-related features using an advertisement (ads) tower, the ads tower comprising a second series of neural network layers;

generate a feature cross representation based on the user embedding representation and the advertisement embedding representation using a feature cross layer;

input the feature cross representation into a multi-task layer that comprises a progressive layered extraction (PLE) component;

calculate, using the multi-task layer, probabilities of one or more user actions, the one or more user actions comprising a user interaction with an advertisement and at least one of page-view, sign-up, add-to-cart, and purchase after the user interaction with the advertisement;

calculate a click-through conversion (CTC) probability based on the probabilities of one or more user actions; and ranking one or more content items based on the CTC probability; and causing display of the one or more content items based on the ranking.

12. The computing system of claim 11, wherein the generating the feature cross representation comprises:

calculate a user cross-feature representation based on the user embedding representation using a first cross layer, the first cross layer comprising a first cross network and a first deep network;

calculate an advertisement cross-feature representation based on the advertisement embedding representation using a second cross layer, the second cross layer comprising a second cross network and a second deep network; and generate the feature cross representation based on the user cross-feature representations and the advertisement cross-feature representations using the feature cross layer.

13. The computing system of claim 11, wherein the PLE component comprises at least two groups of task-specific expert models, the at least two groups of task-specific expert models comprising:

a first group of task-specific expert models configured to calculate a first task representation corresponding to a probability of a user action after the user interaction with the advertisement; and a second group of task-specific expert models configured to calculate a second task representation corresponding to a probability of the user interaction with the advertisement.

14. The computing system of claim 13, wherein the multi-task layer further comprises a parameter personalized network (PPNET) and the instructions further configure the computing system to:

generate a PPNET input based on personalized data, the personalized data comprising data corresponding to a dense feature, a discrete feature, and a sparse id list feature;

generate a combined input by combining the PPNET input with the first task representation; and generate the probability of the user action by processing the combined input using a task-specific expert network.

15. The computing system of claim 14, wherein the combined input is a first combined input and further comprises:

generate a second combined input by combining the PPNET input with the second task representation; and generate the probability of the user interaction with the advertisement.

16. The computing system of claim 11, wherein the instructions further configure the computing system to:

generate a CTC loss function that comprises one or more loss functions associated with the one or more user actions;

adjust one or more weights to the one or more loss functions; and repeatedly tune the multi-task layer by minimizing the CTC loss function that comprises the one or more adjusted weights.

17. The computing system of claim 11, wherein the one or more user actions further comprises at least one of page-view, sign-up, add-to-cart, or purchase after viewing the advertisement;

calculate a view-through conversion (VTC) probability based on the probabilities of the one or more user actions; and wherein the score is generated based on the CTC probability and the VTC probability.

18. The computing system of claim 17, wherein the PLE component comprises at least three task-specific expert networks, the at least three task-specific expert networks comprising:

a first task-specific expert network configured to calculate a probability of one of the one or more user actions after the user interaction with the advertisement;

a second task-specific expert network configured to calculate a probability of the user interaction with the advertisement; and a third task-specific expert network configured to calculate a probability of one of the one or more user actions after the user view the advertisement.

19. The computing system of claim 17, wherein the instructions further configure the computing system to:

calculate a user cross-feature representation based on the user embedding representation using a first cross layer, the first cross layer comprising a first cross network and a first deep network;

calculate an advertisement cross-feature representation based on the advertisement embedding representation using a second cross layer, the second cross layer comprising a second cross network and a second deep network; and perform layer normalization within the first deep network and the second deep network.

20. A non-transitory computer-readable storage medium, the computer-readable storage medium including instructions that when executed by a computer, cause the computer to:

receive input data associated with a plurality of input features, the plurality of input features comprising user-related features and advertisement-related features;

calculate a user embedding representation based on the input data associated with the user-related features using a user tower, the user tower comprising a first series of neural network layers;

calculate an advertisement embedding representation based on the input data associated with the advertisement-related features using an advertisement (ads) tower, the ads tower comprising a second series of neural network layers;

generate a feature cross representation based on the user embedding representation and the advertisement embedding representation using a feature cross layer;

input the feature cross representation into a multi-task layer that comprises a progressive layered extraction (PLE) component;

calculate, using the multi-task layer, probabilities of one or more user actions, the one or more user actions comprising a user interaction with an advertisement and at least one of page-view, sign-up, add-to-cart, and purchase after the user interaction with the advertisement;

calculate a click-through conversion (CTC) probability based on the probabilities of one or more user actions; and ranking one or more content items based on the CTC probability; and causing display of the one or more content items based on the ranking.

* * * * *